(12) United States Patent
Aoyama et al.

(10) Patent No.: US 12,071,492 B2
(45) Date of Patent: Aug. 27, 2024

(54) STYRENE RESIN, STYRENE RESIN COMPOSITION, MOLDED ARTICLE THEREOF, AND STYRENE RESIN PRODUCTION METHOD

(71) Applicant: IDEMITSU KOSAN CO., LTD., Tokyo (JP)

(72) Inventors: Takuma Aoyama, Tokyo (JP); Kiyohiko Yokota, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 88 days.

(21) Appl. No.: 17/965,318

(22) Filed: Oct. 13, 2022

(65) Prior Publication Data

US 2023/0056902 A1 Feb. 23, 2023

Related U.S. Application Data

(63) Continuation of application No. 16/766,537, filed as application No. PCT/JP2018/044101 on Nov. 29, 2018, now abandoned.

(30) Foreign Application Priority Data

Dec. 1, 2017 (JP) ................................ 2017-232080
Dec. 1, 2017 (JP) ................................ 2017-232084

(51) Int. Cl.
*C08F 12/08* (2006.01)
*C08F 112/08* (2006.01)
*C08F 212/08* (2006.01)
*C08K 3/40* (2006.01)
*C08K 5/134* (2006.01)
*C08K 5/37* (2006.01)
*C08K 13/04* (2006.01)
*C08L 25/06* (2006.01)

(52) U.S. Cl.
CPC .............. *C08F 12/08* (2013.01); *C08K 13/04* (2013.01); *C08L 25/06* (2013.01); *C08F 112/08* (2013.01); *C08F 212/08* (2013.01); *C08F 2420/00* (2013.01); *C08K 3/40* (2013.01); *C08K 5/134* (2013.01); *C08K 5/37* (2013.01); *C08L 2201/08* (2013.01); *C08L 2205/24* (2013.01)

(58) Field of Classification Search
CPC .................................. C08F 12/08; C08L 25/06
See application file for complete search history.

(56) References Cited

U.S. PATENT DOCUMENTS 5,093,758 A 3/1992 Funaki et al.
5,183,871 A 2/1993 Yamasaki et al.
5,357,014 A 10/1994 Uchida et al.
6,825,294 B1 11/2004 Yabunouchi et al.

FOREIGN PATENT DOCUMENTS

| JP | H03-070746 A | 3/1991 |
|---|---|---|
| JP | H05-43622 A | 2/1993 |
| JP | H07-247390 A | 9/1995 |
| JP | H07-316216 A | 12/1995 |
| JP | H08-120110 A | 5/1996 |
| JP | 2001-354727 A | 12/2001 |
| JP | 2009-256420 A | 11/2009 |
| JP | 2010-031283 A | 2/2010 |
| JP | 2013-010851 A | 1/2013 |
| JP | 2013-185075 A | 9/2013 |
| JP | 2013-189560 A | 9/2013 |
| JP | 2013-203877 A | 10/2013 |

OTHER PUBLICATIONS

Machine translation of JP2009256420 (Year: 2009).*
International Searching Authority, "International Search Report," issued in connection with International Patent Application No. PCT/JP2018/044101, dated Feb. 26, 2019.
International Searching Authority, "Written Opinion," issued in connection with International Patent Application No. PCT/JP2018/044101, dated Feb. 26, 2019.
European Extended Search Report, dated Jul. 21, 2021, issued in corresponding European Patent Application No. 18883300.8, (7 pages).
Stack et al., "The thermal stability and thermal degradation of blends of syndiotactic polystyrene and polyphenylene ether", Polymer Degradation and Stability, 2003, vol. 79, pp. 29-36.
Office Action issued in corresponding JP Patent Application No. 2019-557340 dated Apr. 26, 2022 (11 pages).
Taiwan Office Action issued in connection with TW Application No. 107142966 dated Jun. 9, 2022 (5 pages).
Chinese Office Action issued in connection with CN Appl. Ser. No. 201880077638.1 dated Oct. 14, 2022 (without English translation).
Office Action issued in corresponding Taiwanese Patent Application No. 107142966, dated Mar. 16, 2023.
Office Action, dated Jul. 4, 2023, issued in corresponding Chinese Patent Application No. 201880077638.1 (25 pages).
Office Action issued in corresponding Chinese Patent Application No. 201880077638.1 dated Dec. 8, 2023 (17 pages).

(Continued)

*Primary Examiner* — Wenwen Cai
(74) *Attorney, Agent, or Firm* — Foley & Lardner LLP

(57) ABSTRACT

A styrene resin having a syndiotactic structure, with an endothermic amount in a range of 175 to 260° C. of less than 30% based on the total endothermic amount, and a styrene resin composition containing 50 to 95% by mass of a thermoplastic resin composition and 5 to 50% by mass of a glass filler, the thermoplastic resin composition containing 100 parts by mass containing 80 to 100% by mass of a styrene resin having a syndiotactic structure and 0 to 20% by mass of a rubbery elastic material, 0.2 to 2.0 parts by mass of at least one kind of an antioxidant selected from a phenol-based antioxidant and a sulfur antioxidant, 1.5 to 5.0 parts by mass of at least one kind of a compound selected from a polyphenylene ether or a modified polyphenylene ether, and at least one kind selected from a nucleating agent or a release agent.

18 Claims, 1 Drawing Sheet

(56) References Cited

OTHER PUBLICATIONS

Office Action issued in corresponding Japanese Patent Application No. 2022-210184 dated Feb. 6, 2024 (6 pages).
Hong et al., "Crystalline Morphology and Melting Behavior of 100% Syndiotactic Polystyrene and 70/30 Blend of Syndiotactic Polystyrene and Poly(2, 6-dimethyl-1, 4-phenylenoxide)", Polymer Journal, vol. 32, No. 3, 2000, pp. 187-191.
Office Action issued in corresponding Korean Patent Application No. 10-2020-7014998 dated Mar. 22, 2024 (19 pages).
Office Action issued in corresponding Japanese Patent Application No. 2022-210184 dated May 21, 2024 (8 pages).

\* cited by examiner

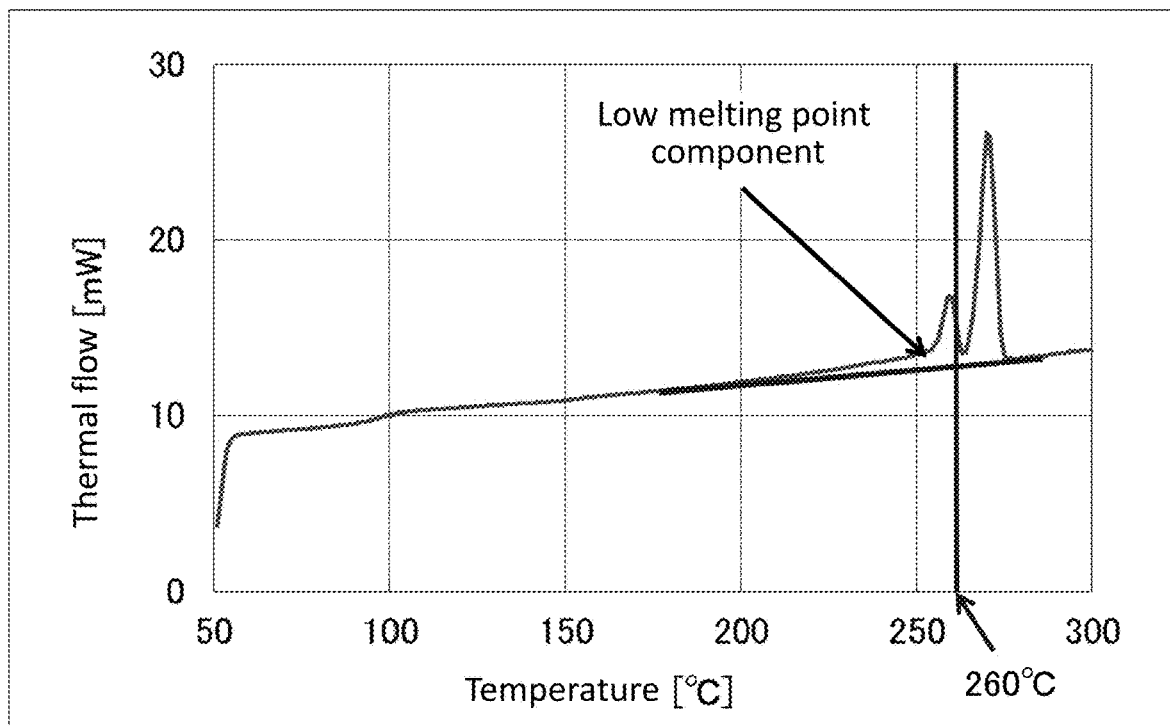

STYRENE RESIN, STYRENE RESIN COMPOSITION, MOLDED ARTICLE THEREOF, AND STYRENE RESIN PRODUCTION METHOD

CROSS-REFERENCE TO RELATED APPLICATIONS

The present application is a Continuation of U.S. patent application Ser. No. 16/766,537, filed on May 22, 2020, which claims priority under 37 U.S.C. § 371 to International Patent Application No. PCT/JP2018/044101, filed Nov. 29, 2018, which claims priority to and the benefit of Japanese Patent Application Nos. 2017-232080 and 2017-232084, both filed on Dec. 1, 2017. The contents of these applications are hereby incorporated by reference in their entireties.

TECHNICAL FIELD

The present invention relates to a styrene resin, a styrene resin composition and a molded article thereof, and a method for producing a styrene resin.

BACKGROUND ART

As a method of mounting an electronic component on a substrate or the like or as a surface mounting method of an electronic component of an automobile, the reflow method has been employed, in which an electronic component or the like is temporarily fixed to a member having a solder spot formed in advance at a prescribed position, and then the solder is melted by heating the member by such a measure as infrared ray or hot air, so as to fix the electronic component or the like thereto. The reflow method can enhance the mounting density of the electronic components on the surface of the member.

Associated with the progress of the surface mounting technique in recent years in the field of electronic devices and the field of automobile electric components, reflowing solder having sufficient heat resistance is being spread, and is receiving attention as a substitute material of lead-containing solder according to the recent raising awareness on the environment. Herein, the resin is demanded to have heat resistance that withstands the lead-free reflow soldering process.

Examples of the resin having heat resistance that is capable of adapting to the lead-free reflow soldering process practically include liquid crystal polymers and aromatic polyamides. However, these are not always suitable for the purposes of an electronic device and an automobile electric component due to such reasons as large specific gravity or inferior dimensional stability caused by water absorption.

It has been known that a styrene polymer having a syndiotactic structure is excellent in mechanical strength, heat resistance, electric characteristics, water absorbing dimensional stability, chemical resistance, and the like, and is expected to apply to various purposes. Among these, it is receiving attention in the fields of electronic devices, automobile electric components, transformer or coil power modules, relays, sensors, and the like, making use of the excellent chemical resistance, heat resistance, electric characteristics, and water absorbing dimensional stability of the styrene polymer having a syndiotactic structure.

For example, PTL 1 describes a styrene polymer having a syndiotactic structure that is excellent in chemical resistance and is excellent in heat resistance.

CITATION LIST

Patent Literature

PTL 1: JP 2001-354727 A

SUMMARY OF INVENTION

Technical Problem

PTL 1 describes the styrene polymer having the particular syndiotactic structure and alleges the excellent heat resistance thereof. However, a resin is exposed to a high temperature in the reflow soldering. Therefore, in consideration of the "reflow heat resistance", ordinary styrene resins having a syndiotactic structure are still insufficient in heat resistance.

Solution to Problem

The present inventors have earnestly investigated for providing a styrene resin having a syndiotactic structure that has sufficient reflow soldering heat resistance. As a result, it has been found that the problem can be solved by suppressing the formation of a by-product that is melted at a particular temperature range. Accordingly, the present invention relates to the following items [1] to [22].

[1] A styrene resin having a syndiotactic structure, which has a proportion of an endothermic amount obtained in a range of 175 to 260° C. of less than 30% based on the total endothermic amount taken as 100%, which are measured at a temperature rise rate of 20° C./min through differential scanning calorimetry.

[2] The styrene resin having a syndiotactic structure according to the item [1], wherein the styrene resin contains triphenylmethane.

[3] The styrene resin having a syndiotactic structure according to the item [2], wherein the styrene resin contains triphenylmethane in an amount of 10 ppm by mass or more.

[4] The styrene resin having a syndiotactic structure according to any one of the items [1] to [3], wherein the styrene resin has a residual aluminum content of 800 ppm by mass or less and a residual titanium content of 12 ppm by mass or less.

[5] The styrene resin having a syndiotactic structure according to the item [4], wherein the residual aluminum content is 70 ppm by mass or more and the residual titanium content is 1.5 ppm by mass or more.

[6] A method for producing a styrene resin having a syndiotactic structure, including performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, the styrene resin produced having a proportion of an endothermic amount obtained in a range of 175 to 260° C. of less than 30% based on the total endothermic amount taken as 100%, which are measured at a temperature rise rate of 20° C./min through differential scanning calorimetry:

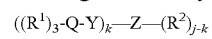

$$((R^1)_3\text{-Q-Y})_k\text{—Z—}(R^2)_{j-k} \tag{1}$$

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j−1).

[7] The method for producing a styrene resin having a syndiotactic structure according to the item [6], wherein the half metallocene transition metal compound (A) is represented by the following formula (2):

$$R^3MU_{a-1}L_b \quad (2)$$

wherein $R^3$ represents a π ligand; M represents at least one kind selected from metals of groups 3 to 5 of the periodic table and lanthanoid transition metals; U represents a monoanion ligand, in which plural ligands represented by U may be the same as or different from each other, and plural ligands represented by U may be bonded to each other via an arbitrary group; L represents a Lewis base; a represents a valence number of M; and b represents 0, 1, or 2, in which in the case where L represents plural groups, the plural groups represented by L may be the same as or different from each other.

[8] The method for producing a styrene resin having a syndiotactic structure according to the item [6] or [7], wherein the central metal of the half metallocene transition metal compound (A) is titanium.

[9] The method for producing a styrene resin having a syndiotactic structure according to any one of the items [6] to [8], wherein the method further uses a compound (D) represented by the following general formula (3) as a catalyst:

$$R^4_pAl(OR^5)_qX^1_{2-p-q}H \quad (3)$$

wherein $R^4$ and $R^5$ each represent an alkyl group having 1 to 8 carbon atoms; $X^1$ represents a halogen atom; and p and q satisfy 0<p≤2, 0≤q<2, and p+q≤2.

[10] The method for producing a styrene resin having a syndiotactic structure according to any one of the items [6] to [9], wherein the method further uses a compound (E) represented by the following general formula (4) as a catalyst:

$$R^6_mAl(OR^7)_nX^2_{3-m-n} \quad (4)$$

wherein $R^6$ and $R^7$ each represent an alkyl group having 1 to 8 carbon atoms; $X^2$ represents a halogen atom; and m and n satisfy 0<m≤3, 0≤n<3, and m+n≤3.

[11] The method for producing a styrene resin having a syndiotactic structure according to any one of the items [6] to [10], wherein the styrene resin is produced through powder bed continuous polymerization.

[12] The method for producing a styrene resin having a syndiotactic structure according to any one of the items [6] to [11], wherein hydrogen is added in an amount of 0 to 20-fold in terms of molar ratio based on the central metal of the half metallocene transition metal compound (A).

[13] The method for producing a styrene resin having a syndiotactic structure according to any one of the items [6] to [12], wherein the method does not include a decalcification treatment.

[14] A styrene resin composition containing 50 to 95% by mass of a thermoplastic resin composition and 5 to 50% by mass of a glass filler, the thermoplastic resin composition containing 100 parts by mass of a thermoplastic resin ($SC^A$) containing 80 to 100% by mass of a styrene resin having a syndiotactic structure and 0 to 20% by mass of a rubbery elastic material, 0.2 to 2.0 parts by mass of at least one kind of an antioxidant ($SC^B$) selected from the group consisting of a phenol-based antioxidant and a sulfur antioxidant, 1.5 to 5.0 parts by mass of at least one kind of a compound ($SC^C$) selected from the group consisting of a polyphenylene ether and a modified polyphenylene ether, and at least one kind selected from a nucleating agent and a release agent.

[15] The styrene resin composition according to item 14, wherein the styrene resin having a syndiotactic structure is the styrene resin according to any one of the items [1] to [5].

[16] The styrene resin composition according to the item [14] or [15], wherein the antioxidant ($SC^B$) is contained in an amount of 0.2 to 1.5 parts by mass per 100 parts by mass of the thermoplastic resin ($SC^A$).

[17] The styrene resin composition according to the item [14] or [15], wherein the antioxidant ($SC^B$) is contained in an amount of 0.3 to 1.0 parts by mass per 100 parts by mass of the thermoplastic resin ($SC^A$).

[18] The styrene resin composition according to any one of the items [14] to [17], wherein the antioxidant ($SC^B$) is a phenol-based antioxidant.

[19] The styrene resin composition according to any one of the items [14] to [18], wherein the nucleating agent is contained in an amount of 0.1 to 3.0 parts by mass per 100 parts by mass of the thermoplastic resin ($SC^A$).

[20] The styrene resin composition according to any one of the items [14] to [18], wherein the release agent is contained in an amount of 0.1 to 3.0 parts by mass per 100 parts by mass of the thermoplastic resin ($SC^A$).

[21] A styrene resin molded article obtained by molding the styrene resin having a syndiotactic structure according to any one of the items [1] to [5] or the styrene resin composition according to any one of the items [14] to [20].

[22] The styrene resin molded article according to the item [21], wherein the molded article is for reflow soldering.

Advantageous Effects of Invention

According to a first embodiment of the present invention, a styrene resin having a syndiotactic structure and a molded article thereof that have the electric characteristics, the water absorbing dimensional stability, the chemical resistance, and the like, and have the excellent reflow soldering heat resistance can be obtained. According to a second embodiment of the present invention, a styrene resin having a syndiotactic structure that has the excellent reflow soldering heat resistance can be mass produced by a continuous method. According to a third embodiment of the present invention, a styrene resin composition and a molded article thereof that achieve both the excellent hydrothermal resistance, and the releasability and the low outgas property can be obtained. Furthermore, the use of the styrene resin having a syndiotactic structure as the first embodiment of the present invention can provide a styrene resin composition and a molded article thereof that have the excellent reflow soldering heat resistance.

BRIEF DESCRIPTION OF DRAWING

The FIGURE is a graph showing the peaks obtained by the DSC measurement method.

DESCRIPTION OF EMBODIMENTS

As a result of the earnest investigations by the present inventors, it has been found that the formation of a component having a low melting point as a by-product adversely affects the heat resistance of the styrene resin having a syndiotactic structure, particularly the reflow soldering heat resistance thereof. Furthermore, it has also be found that a styrene resin composition containing a styrene resin having a syndiotactic structure with a particular antioxidant and the like in particular amounts is excellent in hydrothermal resistance. In particular, in the case where the resin composition contains a styrene resin having a syndiotactic structure excellent in heat resistance containing a less amount of a component having a low melting point with a particular antioxidant and the like in particular amounts, the resin composition that is excellent in hydrothermal resistance and is excellent particularly in reflow soldering heat resistance can be obtained. The present invention will be described in detail below.

In the description herein, the expression "XX to YY" means "XX or more and YY or less". In the description herein, the preferred embodiments may be arbitrarily employed, and a combination of the preferred embodiments may be further preferred.

<Styrene Resin>

The styrene resin of the present invention is a styrene resin having a highly syndiotactic structure (which may be hereinafter abbreviated as an SPS resin). In the description herein, the term "syndiotactic" means a high proportion of the phenyl rings of the styrene units adjacent to each other that are alternately arranged with respect to the plane constituted by the main chain of the polymer block (which may be hereinafter referred to as syndiotacticity).

The tacticity can be quantitatively identified by the nuclear magnetic resonance method using isotope carbon (i.e., the $^{13}$C-NMR method). The existing proportions of continuous plural constitutional units, for example, continuous two monomer units as a diad, continuous three monomer units as a triad, and continuous five monomer units as a pentad, can be quantitatively identified by the $^{13}$C-NMR method.

In the present invention, the "styrene resin having a highly syndiotactic structure" means a polystyrene, a poly(hydrocarbon-substituted styrene), a poly(halostyrene), a poly(haloalkylstyrene), a poly(alkoxystyrene), a poly(vinyl benzoate ester), a hydrogenated polymer or a mixture thereof, and a copolymer having these as a major component, each having a racemic diad (r) fraction of generally 75% by mol or more, and preferably 85% by mol or more, or having a racemic pentad (rrrr) fraction of generally 30% by mol or more, and preferably 50% by mol or more.

Examples of the poly(hydrocarbon-substituted styrene) include poly(methylstyrene), poly(ethylstyrene), poly(isopropylstyrene), poly(tert-butylstyrene), poly(phenyl)styrene, poly(vinylnaphthalene), and poly(vinylstyrene). Examples of the poly(halostyrene) include poly(chlorostyrene), poly(bromostyrene), and poly(fluorostyrene), and examples of the poly(haloalkylstyrene) include poly(chloromethylstyrene). Examples of the poly(alkoxystyrene) include poly(methoxystyrene) and poly(ethoxystyrene).

Examples of the comonomer component of the copolymer containing these constitutional units include the monomers of the aforementioned styrene polymers, and also include olefin monomers, such as ethylene, propylene, butene, hexene, and octene; diene monomers, such as butadiene and isoprene; cyclic olefin monomers; cyclic diene monomers; and polar vinyl monomers, such as methyl methacrylate, maleic anhydride, and acrylonitrile.

Particularly preferred examples of the aforementioned styrene polymers include polystyrene, poly(p-methylstyrene), poly(m-methylstyrene), poly(p-tert-butylstyrene), poly(p-chlorostyrene), poly(m-chlorostyrene), and poly(p-fluorostyrene).

Examples thereof also include a copolymer of styrene and p-methylstyrene, a copolymer of styrene and p-tert-butylstyrene, and a copolymer of styrene and divinylbenzene.

The styrene resin having a syndiotactic structure of the present invention preferably has a weight average molecular weight of $1 \times 10^4$ or more and $1 \times 10^6$ or less, and more preferably 50,000 or more and 500,000 or less, from the standpoint of the flowability of the resin in molding and the strength of the resulting molded article. In the case where the weight average molecular weight is $1 \times 10^4$ or more, a molded article having a sufficient strength can be obtained. In the case where the weight average molecular weight is $1 \times 10^6$ or less, there would be no problem in the flowability of the resin in molding.

In the description herein, the weight average molecular weight is a value that is obtained by measuring by the gel permeation chromatography method using a GPC apparatus (HLC-8321 GPC/HT), produced by Tosoh Corporation, a GPC column (GMHHR-H(S)HT), produced by Tosoh Corporation, and 1,2,4-trichlorobenzene as an eluent, at 145° C., and converting with the standard polystyrene calibration curve. The weight average molecular weight may be hereinafter abbreviated as a "molecular weight".

The styrene resin having a syndiotactic structure of the present invention is required to have a proportion of an endothermic amount obtained in a range of 175 to 260° C. of less than 30% based on the total endothermic amount taken as 100%, which are measured at a temperature rise rate of 20° C./min through differential scanning calorimetry, which is described in detail below.

The melting point of the resin can be measured as a value that is obtained according to the method described in the section "case where the melting temperature is measured after performing a certain heat treatment" of JIS K7121: 1987 with a differential scanning calorimetry (DSC measurement) apparatus under condition of a temperature rise rate of 20° C./min.

The present inventors have paid attention to the fact that the DSC curve obtained through the DSC measurement of the styrene resin having a syndiotactic structure may have two peaks as shown in the FIGURE in some cases. The FIGURE is the graph obtained by measuring by the DSC measurement under heating at a temperature rise rate of 20° C./min.

In the case where the peak on the low temperature side among the two peaks, i.e., the proportion of the endothermic amount in a range of 175 to 260° C. based on the total endothermic amount taken as 100%, which are measured through differential scanning calorimetry, is large, a styrene resin that is inferior in reflow heat resistance is obtained. Although not restricted by the theory, the present inventors estimate the factor lowering the reflow heat resistance by the formation of the low melting point component exhibiting the endothermic behavior in a range of 175 to 260° C. as follows.

A styrene resin having a syndiotactic structure is synthesized with a combination of catalysts described later, and hydrogenation thereof is performed depending on necessity for enhancing the activity thereof. It is considered that a catalyst error changing the tacticity of the resin occurs through the change of the condition in the catalyst field due to the condition of the catalysts and the hydrogenation in a certain amount or more, and thereby the low melting point component is formed in a larger amount to lower the reflow heat resistance of the resin.

The "proportion of an endothermic amount obtained in a range of 175 to 260° C. of less than 30% based on the total endothermic amount taken as 100%" means the proportion of the low melting point component exhibiting the endothermic behavior in a range of 175 to 260° C. The present inventors have found that a styrene resin having a syndiotactic structure that is excellent in reflow heat resistance can be obtained in the case where the proportion of the low melting point component, i.e., the "proportion of an endothermic amount obtained in a range of 175 to 260° C. based on the total endothermic amount taken as 100%, which are measured at a temperature rise rate of 20° C./min through differential scanning calorimetry, is less than 30%.

Although the details of the low melting point component are not necessarily clear, the present inventors have clarified that the increase of the low melting point component is caused by the increase of the component having a tacticity of 90% by mol or less in terms of racemic pentad. It is estimated that in the case where the tacticity becomes 90% by mol or less in terms of racemic pentad, the thickness of the crystal is changed, and the melting point becomes lower than the styrene resin having a syndiotactic structure with a high tacticity.

Furthermore, it has also been found that the low melting point component is a component that has a weight average molecular weight of 20,000 or less. The weight average molecular weight of the low melting point component referred herein can be measured through temperature rising elution fractionation.

The proportion of an endothermic amount obtained in a range of 175 to 260° C. based on the total endothermic amount taken as 100%, i.e., the proportion of the low melting point component, of the styrene resin having a syndiotactic structure of the present invention is less than 30%, preferably 28% or less, and more preferably 27% or less. The proportion of the low melting point component that is 30% or more results in inferior reflow heat resistance.

The styrene resin having a syndiotactic structure of the present invention may contain triphenylmethane. Triphenylmethane is a component that is derived from the catalyst in the production described later. The triphenylmethane amount in the styrene resin of the present invention is preferably 10 ppm by mass or more, more preferably 20 ppm by mass or more, further preferably 30 ppm by mass or more, and particularly preferably 40 ppm by mass or more. The upper limit of the triphenylmethane amount is preferably 250 ppm by mass or less.

In the case where the triphenylmethane amount in the styrene resin of the present invention is 10 ppm by mass or more, the styrene resin having a syndiotactic structure with a high tacticity can be obtained with a sufficient catalyst amount.

The styrene resin having a syndiotactic structure of the present invention may contain aluminum and titanium derived from the catalyst in the production. The particular styrene resin of the present invention preferably has a residual aluminum content of 800 ppm by mass or less and a residual titanium content of 12 ppm by mass or less. The case where the residual aluminum content is 800 ppm by mass or less and, the residual titanium content is 12 ppm by mass or less is preferred since the styrene resin can have high reflow heat resistance.

The residual aluminum content in the styrene resin of the present invention is preferably 700 ppm by mass or less, and more preferably 500 ppm by mass or less, and the residual titanium content therein is preferably 11 ppm by mass or less, more preferably 10 ppm by mass or less, and further preferably 8 ppm by mass or less.

Aluminum and titanium are derived from the catalyst in the production as described above.

The production of a styrene resin is classified into a "batch method" and a "continuous method". The "batch method" can suppress the amount of the catalyst used as compared to the "continuous method", but the amount of the styrene resin obtained in one lot of production is small, which is inferior in economic efficiency from the standpoint of the energy and the like. The "continuous method" can provide a large amount of the styrene resin with a high energy efficiency, but requires a certain amount of the catalyst as compared to the "batch method".

The particular styrene resin of the present invention can achieve both the heat resistance and the characteristics inherent to the resin even though the residual aluminum content is 70 ppm by mass or more, and the residual titanium content is 1.5 ppm by mass or more. In the case where the residual metal contents are in these ranges, the production by the continuous method can be performed, and the styrene resin can be obtained commercially advantageously. For the further efficient production, the residual aluminum content may be 115 ppm by mass or more, and the residual titanium content may be 2.5 ppm by mass or more.

The styrene resin obtained by the batch method generally has a residual aluminum content of approximately 16 ppm by mass and a residual titanium content of approximately 0.025 ppm by mass, which are smaller than the continuous method, while these values fluctuate depending on the production amount and the properties of the resulting styrene resin. However, the efficient production as in the continuous method is difficult to perform.

<Method for Producing Styrene Resin>

The second embodiment of the present invention relates to a method for producing a styrene resin having a syndiotactic structure. Specifically, the present invention provides a method for producing a styrene resin having a syndiotactic structure, including performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, the styrene resin produced having a proportion of an endothermic amount obtained in a range of 175 to 260° C. of less than 30% based on the total endothermic amount taken as 100%, which are measured at a temperature rise rate of 20° C./min through differential scanning calorimetry:

$$((R^1)_3\text{-}Q\text{-}Y)_k\text{---}Z\text{---}(R^2)_{j\text{-}k} \quad (1)$$

wherein R¹ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j-1).

The resulting styrene resin having a syndiotactic structure has the particular properties described for the first embodiment of the present invention.

The production method of the present invention requires the use, as a catalyst, of the half metallocene transition metal compound (A) having at least one kind selected from metals of groups 3 to 5 of the periodic table and lanthanoid transition metals as a central metal, the compound (B) represented by the general formula (1), and the compound (C) selected from at least one kind of an oxygen-containing compound (c1) and a compound (c2) capable of forming an ionic complex through reaction with a transition metal compound. The catalyst is described in detail below.

<Half Metallocene Transition Metal Compound (A)>

The half metallocene transition metal compound (A) is a half metallocene transition metal compound that has at least one kind selected from metals of groups 3 to 5 of the periodic table and lanthanoid transition metals as a central metal.

The half metallocene transition metal compound (A) may have, for example, a structure represented by the general formula (2):

$$R^3MU_{a-1}L_b \quad (2)$$

wherein $R^3$ represents a π ligand; M represents at least one kind selected from metals of groups 3 to 5 of the periodic table and lanthanoid transition metals; U represents a monoanion ligand, in which plural ligands represented by U may be the same as or different from each other, and plural ligands represented by U may be bonded to each other via an arbitrary group; L represents a Lewis base; a represents a valence number of M; and b represents 0, 1, or 2, in which in the case where L represents plural groups, the plural groups represented by L may be the same as or different from each other. In the general formula (2), $R^3$ represents a r ligand, and preferably represents a substituted or unsubstituted (which may be hereinafter referred to as (substituted)) cyclopentadienyl group, a (substituted) indenyl group, or a condensed polycyclic cyclopentadienyl group, in which at least one of the polymembered rings condensed to the cyclopentadienyl group is a saturated ring. Examples of the condensed polycyclic cyclopentadienyl group include ones selected from condensed polycyclic cyclopentadienyl groups represented by the general formulae (i) to (iii):

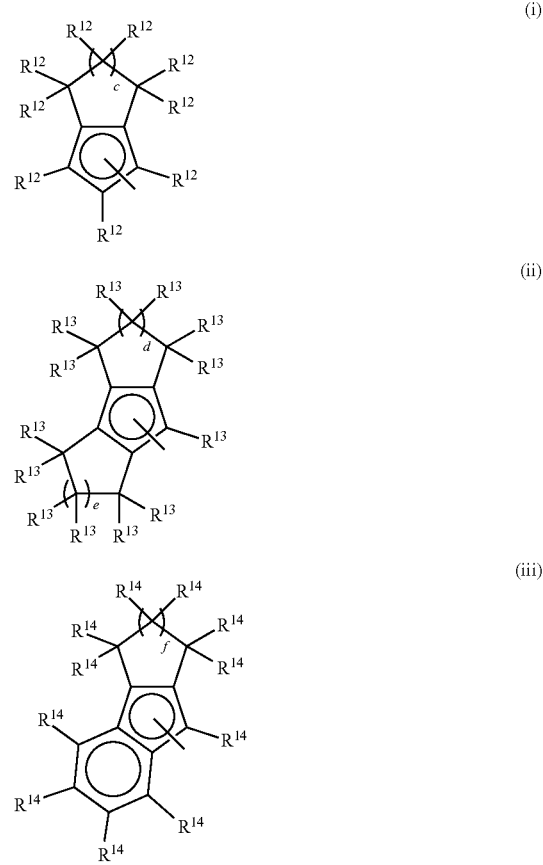

wherein $R^{12}$, $R^{13}$, and $R^{14}$ each represent a hydrogen atom, a halogen atom, an aliphatic hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amide group, a carboxy group, or an alkylsilyl group, in which groups represented by each of $R^{12}$, $R^{13}$, and $R^{14}$ may be the same as or different from each other; and c, d, e, and f each represent an integer of 1 or more.

Preferred examples among these include ones selected from condensed polycyclic cyclopentadienyl groups represented by the following general formulae (iv) to (vi):

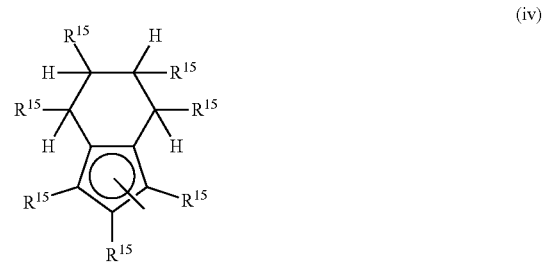

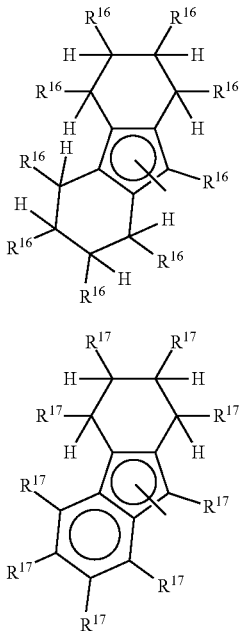

(v)

(vi)

wherein $R^{15}$, $R^{16}$, and $R^{17}$ each represent a hydrogen atom or a methyl group, in which groups represented by each of $R^{15}$, $R^{16}$, and $R^{17}$ may be the same as or different from each other.

Among these, 4,5,6,7-tetrahydroindenyl groups are preferred from the standpoint of the catalyst activity and the easiness of synthesis. Specific examples, of the group represented by $R^3$ include a 4,5,6,7-tetrahydroindenyl group; a 1-methyl-4,5,6,7-tetrahydroindenyl group; a 2-methyl-4,5,6,7-tetrahydroindenyl group; a 1,2-dimethyl-4,5,6,7-tetrahydroindenyl group; a 1,3-dimethyl-4,5,6,7-tetrahydroindenyl group; a 1,2,3-trimethyl-4,5,6,7-tetrahydroindenyl group; a 1,2,3,4,5,6,7-heptamethyl-4,5,6,7-tetrahydroindenyl group; a 1,2,4,5,6,7-hexamethyl-4,5,6,7-tetrahydroindenyl group; a 1,3,4,5,6,7-hexamethyl-4,5,6,7-tetrahydroindenyl group; an octahydrofluorenyl group; a 1,2,3,4-tetrahydrofluorenyl group; a 9-methyl-1,2,3,4-tetrahydrofluorenyl group; and 9-methyloctahydrofluorenyl group.

M represents a metal of groups 3 to 5 of the periodic table or a lanthanoid transition metal. Examples of the metal include metals of the group 3 of the periodic table, such as scandium and yttrium, metals of the group 4 of the periodic table, such as titanium, zirconium, and hafnium, lanthanoid transition metals, and metals of the group 5 of the periodic table, such as niobium and tantalum. Metals of the group 3 of the periodic table and metals of the group 4 of the periodic table are preferred, and scandium, yttrium, and titanium are preferably used, from the standpoint of the catalyst activity. Among these, titanium is more preferred from the standpoint of the handling.

U represents a monoanion ligand, and specific examples thereof include a hydrogen atom, a halogen atom, an aliphatic hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amide group, a carboxy group, and an alkylsilyl group. Plural ligands represented by U may be the same as or different from each other, and may be bonded to each other via an arbitrary group. Specific examples of the ligand represented by U include a hydrogen atom, a chlorine atom, a bromine atom, an iodine atom, a methyl group, a benzyl group, a phenyl group, a trimethylsilylmethyl group, a methoxy group, an ethoxy group, a phenoxy group, a thiomethoxy group, a thiophenoxy group, a dimethylamino group, and a diisopropylamino group. L represents a Lewis base; a represents a valence number of M; and b represents 0, 1, or 2.

The half metallocene transition metal compound (A) represented by the general formula (2) used is preferably a compound having groups that are arbitrarily selected from $R^3$, M, and U exemplified above.

Examples of the half metallocene transition metal compound (A) represented by the general formula (2) include pentamethylcyclopentadienyl titanium trichloride; 1,2,3-trimethylindenyl titanium trichloride; 4,5,6,7-tetrahydroindenyl titanium trichloride; 4,5,6,7-tetrahydroindenyl titanium trimethyl; 4,5,6,7-tetrahydroindenyl titanium tribenzyl; 4,5,6,7-tetrahydroindenyl trimethoxide; 1-methyl-4,5,6,7-tetrahydroindenyl titanium trichloride; 1-methyl-4,5,6,7-tetrahydroindenyl titanium trimethyl; 1-methyl-4,5,6,7-tetrahydroindenyl titanium tribenzyl; 1-methyl-4,5,6,7-tetrahydroindenyl titanium trimethoxide; 2-methyl-4,5,6,7-tetrahydroindenyl titanium trichloride; 2-methyl-4,5,6,7-tetrahydroindenyl titanium trimethyl; 2-methyl-4,5,6,7-tetrahydroindenyl titanium tribenzyl; 2-methyl-4,5,6,7-tetrahydroindenyl titanium trimethoxide; 1,2-dimethyl-4,5,6,7-tetrahydroindenyl titanium trichloride; 1,2-dimethyl-4,5,6,7-tetrahydroindenyl titanium trimethyl; 1,2-dimethyl-4,5,6,7-tetrahydroindenyl titanium tribenzyl; 1,2-dimethyl-4,5,6,7-tetrahydroindenyl titanium trimethoxide; 1,3-dimethyl-4,5,6,7-tetrahydroindenyl titanium trichloride; 1,3-dimethyl-4,5,6,7-tetrahydroindenyl titanium trimethyl; 1,3-dimethyl-4,5,6,7-tetrahydroindenyl titanium tribenzyl; 1,3-dimethyl-4,5,6,7-tetrahydroindenyl titanium trimethoxide; 1,2,3-trimethyl-4,5,6,7-tetrahydroindenyl titanium trichloride; 1,2,3-trimethyl-4,5,6,7-tetrahydroindenyl titanium trimethyl; 1,2,3-trimethyl-4,5,6,7-tetrahydroindenyl titanium tribenzyl; 1,2,3-trimethyl-4,5,6,7-tetrahydroindenyl titanium trimethoxide; 1,2,3,4,5,6,7-heptamethyl-4,5,6,7-tetrahydroindenyl titanium trichloride; 1,2,3,4,5,6,7-heptamethyl-4,5,6,7-tetrahydroindenyl titanium trimethyl; 1,2,3,4,5,6,7-heptamethyl-4,5,6,7-tetrahydroindenyl titanium tribenzyl; 1,2,3,4,5,6,7-heptamethyl-4,5,6,7-tetrahydroindenyl titanium trimethoxide; 1,2,4,5,6,7-hexamethyl-4,5,6,7-tetrahydroindenyl titanium trichloride; 1,2,4,5,6,7-hexamethyl-4,5,6,7-tetrahydroindenyl titanium trimethyl; 1,2,4,5,6,7-hexamethyl-4,5,6,7-tetrahydroindenyl titanium tribenzyl; 1,2,4,5,6,7-hexamethyl-4,5,6,7-tetrahydroindenyl titanium trimethoxide; 1,3,4,5,6,7-hexamethyl-4,5,6,7-tetrahydroindenyl titanium trichloride; 1,3,4,5,6,7-hexamethyl-4,5,6,7-tetrahydroindenyl titanium trimethyl; 1,3,4,5,6,7-hexamethyl-4,5,6,7-tetrahydroindenyl titanium tribenzyl; 1,3,4,5,6,7-hexamethyl-4,5,6,7-tetrahydroindenyl titanium trimethoxide; octahydrofluorenyl titanium trichloride; octahydrofluorenyl titanium trimethyl; octahydrofluorenyl titanium tribenzyl; octahydrofluorenyl titanium trimethoxide; 1,2,3,4-tetrahydrofluorenyl titanium trichloride; 1,2,3,4-tetrahydrofluorenyl titanium trimethyl; 1,2,3,4-tetrahydrofluorenyl titanium tribenzyl; 1,2,3,4-tetrahydrofluorenyl titanium trimethoxide; 9-methyl-1,2,3,4-tetrahydrofluorenyl titanium trichloride; 9-methyl-1,2,3,4-tetrahydrofluorenyl titanium trimethyl; 9-methyl-1,2,3,4-tetrahydrofluorenyl titanium tribenzyl; 9-methyl-1,2,3,4-tetrahydrofluorenyl titanium trimethoxide; 9-methyl-octahydrofluorenyl titanium trichloride; 9-methyl-octahydrofluorenyl titanium trimethyl; 9-methyl-octahydrofluorenyl titanium tribenzyl; and 9-methyl-octahydrofluorenyl titanium trimethoxide, and also include compounds obtained by replacing titanium in these compounds by zirconium or hafnium, and analogous compounds of a transition metal element of the other groups or the lanthanoid series, but are not limited thereto. A yttrium compound, a scandium compound, and a titanium compound are preferred from the standpoint of the catalyst activity. Among these, a titanium compound is preferred from the standpoint of the handling.

<Compound (B) Represented by General Formula (1)>

The general formula (1) is cited again below:

$((R^1)_3\text{-Q-Y})_k\text{—}Z\text{—}(R^2)_{j-k}$ (1)

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j-1).

Among these, the following are preferably used:

(1) Q represents carbon, Y represents oxygen, and Z represents aluminum;

(2) at least one of three groups represented by $R^1$ is an aromatic hydrocarbon group having 6 to 30 carbon atoms;

(3) three groups represented by $R^1$ all are a hydrocarbon group having 1 or more carbon atoms;

(4) three groups represented by $R^1$ all are an aromatic hydrocarbon group having 6 to 30 carbon atoms, and preferably a phenyl group; or (5) $R^2$ represents an alkyl group having 2 or more carbon atoms.

In particular, the compound (B) is preferably a compound represented by the general formula (1), in which Z represents aluminum.

The compound (B) represented by the general formula (1) is not limited by the production method thereof, as far as the compound has the structure represented by the general formula, and a compound obtained through reaction of a compound (b1) represented by the general formula $(R^1)_3$—C—$OR^{33}$ and a compound (b2) represented by the general formula $Z(R^2)_j$ is preferably used.

Herein, $R^1$, Z, j, and $R^2$ have the same meanings as above. $R^{33}$ represents a hydrogen atom, a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group. $R^1$ and $R^{33}$ may be the same as or different from each other. $R^1$ and $R^{33}$ may be bonded to each other to form a ring structure depending on necessity.

Specific examples of the compound of the formula (1) include reaction products of at least one kind (b1) selected from alcohol compounds, ether compounds, aldehyde compounds, ketone compounds, carboxylic acid compounds, and carboxylate ester compounds, and an aluminum compound (b2). More preferred examples thereof include a reaction product of an alcohol compound (b1) and an aluminum compound (b2). In this case, it is also preferred that (1) at least one of three groups represented by $R^1$ in $(R^1)_3$ is an aromatic hydrocarbon group having 6 to 30 carbon atoms; (2) three groups represented by $R^1$ in $(R^1)_3$ all are a hydrocarbon group having 1 or more carbon atoms; (3) three groups represented by $R^1$ in $(R^1)_3$ all are an aliphatic hydrocarbon group having 1 to 30 carbon atoms; (4) three groups represented by $R^1$ in $(R^1)_3$ all are an aromatic hydrocarbon group having 6 to 30 carbon atoms, and preferably a phenyl group; or (5) $R^2$ represents an alkyl group having 2 or more carbon atoms. Specific examples thereof include a compound, in which $R^1$ all represent a phenyl group, Q represents carbon, Y represents oxygen, Z represents aluminum, k=1, and $R^2$ represents an isobutyl group. In other words, a reaction product of triphenylmethanol (b1) and triisobutylaluminum (b2) is most preferred.

The reaction condition of the compound (b1) and the compound (b2) is not particularly limited, and the following condition may be preferably selected. The blending ratio in terms of molar ratio (compound (b1))/(compound (b2)) is preferably in a range of 1/0.01 to 1/100, more preferably 1/0.5 to 1/50, and particularly preferably 1/0.8 to 1/10. The reaction temperature is preferably −80° C. to 300° C., and more preferably −10° C. to 50° C.

The solvent used in the reaction is also not particularly limited, and a solvent used in polymerization, such as toluene and ethylbenzene, is preferably used.

The compound (b1) and the compound (b2) may be directly fed to the field of catalyst synthesis or the field of polymerization, instead of the compound (B) represented by the general formula (1). In this case, accordingly, the catalyst components are the half metallocene transition metal compound (A), the compound (b1), and the compound (b2).

<Compound (C)>

The compound (C) is selected from at least one kind of an oxygen-containing compound (c1) and a compound (c2) capable of forming an ionic complex through reaction with a transition metal compound. Among these, an oxygen-containing compound (c1) is preferred.

[Oxygen-Containing Compound (c1)]

Examples of the oxygen-containing compound include compounds represented by the general formula (c11) and/or the general formula (c12).

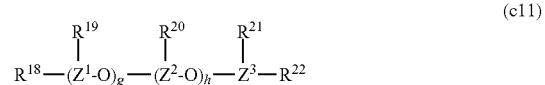

(c11)

(c12)

In the general formulae (c11) and (c12), $R^{18}$ to $R^{24}$ each represent an alkyl group having 1 to 8 carbon atoms, and specific examples thereof include a methyl group, an ethyl group, a n-propyl group, an isopropyl group, various butyl groups, various pentyl groups, various hexyl groups, various heptyl groups, and various octyl groups. $R^{18}$ to $R^{22}$ may be the same as or different from each other, and $R^{23}$ and $R^{24}$ may be the same as or different from each other. $Z^1$ to $Z^5$ each represent an element of group 13 of the periodic table, and specific examples thereof include B, Al, Ga, In, and Tl, in which B and Al are preferred, and Al is more preferred. $Z^1$ to $Z^3$ may be the same as or different from each other, and $Z^4$ and $Z^5$ may be the same as or different from each other. g, h, s, and t each represent a number of 0 to 50, provided that (g+h) and (s+t) each are 1 or more. g, h, s, and t each are preferably in a range of 1 to 20, and particularly preferably a range of 1 to 5.

The oxygen-containing compound is preferably an alkylaluminoxane. Preferred specific examples thereof include methylaluminoxane, methylisobutylaluminoxane, and isobutylaluminoxane.

[Compound (c2) Capable of Forming Ionic Complex Through Reaction with Transition Metal Compound]

Examples of the compound (c2) capable of forming an ionic complex through reaction with a transition metal compound include a coordination complex compound containing an anion having plural groups bonded to a metal and a cation, and a Lewis acid. The coordination complex compound containing an anion having plural groups bonded to a metal and a cation includes various compounds, and for example, a compound represented by the following general formula (c21) or (c22) is preferably used.

(c21)

(c22)

In the formulae (c21) and (c22), $L^2$ is $M^5$, $R^{25}R^{26}M^6$, or $R^{27}{}_3C$ described later, $L^3$ represents a Lewis base, and $M^3$ and $M^4$ each represent a metal selected from groups 5 to 15 of the periodic table. $M^5$ represents a metal selected from group 1 and groups 8 to 12 of the periodic table, and $M^6$ represents a metal selected from groups 8 to 10 of the periodic table. $X^3$ each represent a hydrogen atom, a dialkylamino group, an alkoxy group, an aryloxy group, an alkyl group having 1 to 20 carbon atoms, an aryl group having 6 to 20 carbon atoms, an alkylaryl group, an arylalkyl group, a substituted alkyl group, an organic metalloid group, or a halogen atom. Plural groups or atoms represented by $X^3$ may be the same as or different from each other. $R^{25}$ and $R^{26}$ each represent a cyclopentadienyl group, a substituted cyclopentadienyl group, an indenyl group, or a fluorenyl group, and $R^{27}$ represents an alkyl group or an aryl group. v represents an integer of 1 to 7, which is a valence number of $M^3$ or $M^4$, u represents an integer of 2 to 8, i represents an integer of 1 to 7, which is an ionic valence number of $[L^2]$ or $[L^3-H]$, y represents an integer of 1 or more, and $z=y\times i/(u-v)$.

Specific examples of $M^3$ and $M^4$ include B, Al, Si, P, As, and Sb, specific examples of $M^5$ include Ag, Cu, Na, and Li, and specific examples of $M^6$ include Fe, Co, and Ni. Specific examples of $X^3$ include dialkylamino groups, such as a dimethylamino group and a diethylamino group; alkoxy groups, such as a methoxy group, an ethoxy group, and a n-butoxy group; aryloxy groups, such as a phenoxy group, a 2,6-dimethylphenoxy group, and a naphthyloxy group; alkyl groups having 1 to 20 carbon atoms, such as a methyl group, an ethyl group, a n-propyl group, an isopropyl group, a n-butyl group, a n-octyl group, and a 2-ethylhexyl group; aryl groups having 6 to 20 carbon atoms, alkylaryl groups, and arylalkyl groups, such as a phenyl group, a p-tolyl group, a benzyl group, a pentafluorophenyl group, 3,5-di (trifluoromethyl)phenyl group, a 4-tert-butylphenyl group, a 2,6-dimethylphenyl group, a 3,5-dimethylphenyl group, a 2,4-dimethylphenyl group, and a 1,2-dimethylphenyl group; halogen, such as F, Cl, Br, and I; and organic metalloid groups, such as a pentamethylantimony group, a trimethylsilyl group, a trimethylgermyl group, a diphenylarsine group, a dicyclohexylantimony group, and a diphenylboron group. Specific examples of the substituted cyclopentadienyl group represented by $R^{25}$ and $R^{26}$ include a methylcyclopentadienyl group, a butylcyclopentadienyl group, and a pentamethylcyclopentadienyl group.

In the present invention, specific examples of the anion having plural groups bonded to a metal include $B(C_6F_5)_4{}^-$, $B(C_6HF_4)_4{}^-$, $B(C_6H_2F_3)_4{}^-$, $B(C_6H_3F_2)_4{}^-$, $B(C_6H_4F)_4{}^-$, $B(C_6(CF_3)F_4)_4{}^-$, $B(C_6H_5)_4{}^-$, $PF_6{}^-$, $P(C_6F_5)_6{}^-$, and $Al(C_6HF_4)_4{}^-$. Examples of the metal cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. In the above formulae, Cp represents a cyclopentadienyl group, Me represents a methyl group, and Bu represents a butyl group. Examples of the cation also include nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, and N,N-diethylanilinium; a carbenium compound, such as triphenylcarbenium, tri(4-methylphenyl)carbenium, and tri(4-methoxyphenyl)carbenium; alkylphosphonium ions, such as $CH_3PH_3{}^+$, $C_2H_5PH_3{}^+$, $C_3H_7PH_3{}^+$, $(CH_3)_2PH_2{}^+$, $(C_2H_5)_2PH_2{}^+$, $(C_3H_7)_2PH_2{}^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, and $(C_3H_7)_4P^+$; and arylphosphonium ions, such as $C_6H_5PH_3{}^+$, $(C_6H_5)_2PH_2{}^+$, $(C_6H_5)_3PH^+$, $(C_6H_5)_4P^+$, $(C_2H_5)_2(C_6H_5)PH^+$, $(CH_3)(C_6H_5)PH_2{}^+$, $(CH_3)_2(C_6H_5)PH^+$, and $(C_2H_5)_2(C_6H_5)_2P^+$.

Among the compound of the general formulae (c21) and (c22), the following compounds are particularly preferably used.

Examples of the compound of the general formula (c21) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, and silver tetrafluoroborate.

Examples of the compound of the general formula (c22) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

Examples of the Lewis acid used include $B(C_6F_5)_3$, $B(C_6HF_4)_3$, $B(C_6H_2F_3)_3$, $B(C_6H_3F_2)_3$, $B(C_6H_4F)_3$, $B(C_6H_5)_3$, $BF_3$, $B[C_6(CF_3)F_4]_3$, $PF_5$, $P(C_6F_5)_5$, and $Al(C_6HF_4)_3$.

In the second embodiment of the present invention, the compound (D) and/or the compound (E) below may also be used as a catalyst, in addition to the compound (A), the compound (B), and the compound (C) described above.

<Compound (D)>

The compound (D) is a compound represented by the following general formula (3):

$$R^4_p Al(OR^5) X^1_{2-p-q} H \quad (3)$$

wherein $R^4$ and $R^5$ each represent an alkyl group having 1 to 8 carbon atoms; $X^1$ represents a halogen atom; and p and q satisfy $0<p\leq 2$, $0\leq q<2$, and $p+q\leq 2$.

The compound (D) represented by the general formula (3) is preferably a dialkylaluminum hydride compound and a monoalkylaluminum hydride compound.

Specific examples thereof include dialkylaluminum hydrides, such as dimethylaluminum hydride, diethylaluminum hydride, di-n-propylaluminum hydride, diisopropylaluminum hydride, di-n-butylaluminum hydride, and diisobutylaluminum hydride; alkylaluminum halohydrides, such as methylaluminum chlorohydride, ethylaluminum chlorohydride, n-propylaluminum chlorohydride, isopropylaluminum chlorohydride, n-butylaluminum chlorohydride, and isobutylaluminum chlorohydride; and alkylaluminum alkoxyhydrides, such as ethylaluminum methoxyhydride and ethylaluminum ethoxyhydride. Among these, diisobutylaluminum hydride is preferred from the standpoint of the catalyst activity.

<Compound (E)>

The compound (E) is a compound represented by the following general formula (4):

$$R^6_m Al(OR^7)_n X^2_{3-m-n} \quad (4)$$

wherein $R^6$ and $R^7$ each represent an alkyl group having 1 to 8 carbon atoms; $X^2$ represents a halogen atom; and m and n satisfy $0<m\leq 3$, $0\leq n<3$, and $m+n\leq 3$.

The compound (E) represented by the general formula (4) is preferably a trialkylaluminum and a dialkylaluminum compound from the standpoint of the catalyst activity.

Specific examples thereof include trialkylaluminum, such as trimethylaluminum, triethylaluminum, tri-n-propylaluminum, triisopropylaluminum, tri-n-butylaluminum, and triisobutylaluminum; dialkylaluminum halides, such as dimethylaluminum chloride, diethylaluminum chloride, di-n-propylaluminum chloride, diisopropylaluminum chloride, di-n-butylaluminum chloride, and diisobutylaluminum chloride; and dialkylaluminum alkoxides, such as diethylaluminum methoxide and diethylaluminum ethoxide, and among these, triisobutylaluminum is preferred.

In the production method of the present invention, as described above, the half metallocene transition metal compound (A), the compound (B) represented by the general formula (1), and the compound (C), and depending on necessity the compound (D) and/or the compound (E) may be used in combination as the catalyst. The preparation method of the catalyst used is not particularly limited, and the catalyst may be prepared in the following order.

(1) Contact Sequence of Components (i) In the case where the half metallocene transition metal compound (A), the compound (B), and the compound (C) are used, examples of the method include a method of contacting the half metallocene transition metal compound (A) and the compound (C) with each other, and then contacting the compound (B) therewith, a method of contacting the half metallocene transition metal compound (A) and the compound (B) with each other, and then contacting the compound (C) therewith, a method of contacting the compound (B) and the compound (C) with each other, and then contacting the half metallocene transition metal compound (A) therewith, and a method of contacting the three components with each other simultaneously.

(ii) In the case where the combination of the compound (D) and/or the compound (E) is used in addition to the three components, the contact sequence of the compound (D) and/or the compound (E) is not particularly limited. Specifically, the compound (D) and/or the compound (E) may be used after contacting with the half metallocene transition metal compound (A), the compound (D) and/or the compound (E) may be used after contacting with the compound (B), and the compound (D) and/or the compound (E) may be used after contacting with the compound (C). In alternative, a method of contacting the half metallocene transition metal compound (A), the compound (C), and the compound (D) and/or the compound (E) with each other in advance, and then contacting the compound (B) component therewith may be used.

(iii) In the case where the compound (b1) and the compound (b2) are used as the compound (B), the contact sequence of the components is not particularly limited as similar to the aforementioned items (i) and (ii), and it is preferred that the component (b1) and the component (b2) are contacted with each other in advance before contacting the other components.

(2) Proportions of Components (i) Case using Half Metallocene Transition Metal Compound (A), Compound (B), and Compound (C)

In the case where the compound (B) is the aluminum compound, the compound (B) may be selected in a range of 0.5 to 1,000, and preferably 1 to 100, in terms of molar ratio of aluminum atom, per 1 mol of the half metallocene transition metal compound (A) component.

In the case where the oxygen-containing compound is used as the compound (C), and the compound (C) is an organoaluminum compound, the molar ratio of the half metallocene transition metal compound (A) and the compound (C) may be selected in a range of 1 to 10,000, and preferably 10 to 1,000, in terms of molar ratio of aluminum atom, per 1 mol of the half metallocene transition metal compound (A). In the case where the compound capable of forming an ionic complex through reaction with a transition metal compound is used as the compound (C) component, and the compound (C) is the boron compound, the molar ratio may be selected in a range of 0.5 to 10, and preferably 0.8 to 5, in terms of molar ratio of boron atom, per 1 mol of the half metallocene transition metal compound (A).

(ii) In the case where the compound (b1) and the compound (b2) are used as the compound (B), the molar ratio (compound (b1))/(compound (b2)) is preferably in a range of 1/0.01 to 1/100, more preferably 1/0.5 to 1/50, and particularly preferably 1/0.8 to 1/10. In the case where the component (b2) is the aluminum compound, the component (b2) is preferably selected in a range of 0.5 to 10,000, more preferably 0.5 to 1,000, and most preferably 1 to 1,000, in terms of molar ratio of aluminum atom, per 1 mol of the half metallocene transition metal compound (A).

(iii) Case using Compound (D) and/or Compound (E) in addition to Three Components In the case where the compound (D) and/or the compound (E) is the aluminum compound, the blending amount of the compound (D) and/or the compound (E) may be selected in a range of 0.5 to 1,000, and preferably 1 to 100, in terms of molar ratio of aluminum atom, per 1 mol of the half metallocene transition metal compound (A).

(3) Contact Condition of Components

The catalyst components may be contacted in an inert atmosphere, such as nitrogen, at the polymerization temperature or lower. For example, a temperature in a range of −30 to 200° C. may be used.

The process of the practical production of the styrene polymer using the catalyst is described in detail. In the method for producing the styrene polymer of the present invention, homopolymerization of a styrene compound and copolymerization of a styrene compound and another styrene compound (i.e., copolymerization of different styrene compounds) can be favorably performed by using the polymerization catalyst described above.

<Monomer>

The styrene compound is not particularly limited, and examples thereof include styrene; alkylstyrene compounds, such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, 2,4-dimethylstyrene, 2,5-dimethylstyrene, and 3,5-dimethylstyrene; alkoxystyrene compounds, such as p-methoxystyrene, o-methoxystyrene, and m-methoxystyrene; and halostyrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene, and also include mesitylstyrene, trimethylsilylstyrene, a vinylbenzoate ester, and divinylbenzene.

Among these, styrene, an alkylstyrene compound, and divinylbenzene are preferred, and styrene, p-methylstyrene, and divinylbenzene are more preferred.

In the present invention, the styrene compounds may be used alone or as an arbitrary combination of two or more kinds thereof.

<Polymerization Condition>

1. Preliminary Polymerization

In the method for producing the styrene polymer of the present invention, preliminary polymerization may be performed by using the polymerization catalyst described above. The preliminary polymerization may be performed by contacting, for example, a small amount of a styrene compound with the catalyst, and the method therefor is not particularly limited and may be performed by a known method.

The styrene compound used in the preliminary polymerization is not particularly limited, and aforementioned compounds may be used. The preliminary polymerization temperature is generally −20 to 200° C., and preferably −1° C. to 130° C. In the preliminary polymerization, the solvent used may be an inert hydrocarbon, an aliphatic hydrocarbon, an aromatic hydrocarbon, a monomer, and the like.

2. Main Polymerization

The polymerization method in the main polymerization is not particularly limited, and a continuous polymerization method may be used and performed by an arbitrary method, such as a slurry polymerization method, a powder bed polymerization method, a solution polymerization method, a gas phase polymerization method, a bulk polymerization method, and a suspension polymerization method. Among these, powder bed continuous polymerization is preferably performed from the standpoint of the industrial scale production.

The contact sequence of the components of the catalyst and the monomer is not particularly limited. Specifically, a method of preparing the catalyst by mixing the components of the catalyst as described above in advance, and then feeding the monomer thereto may be employed. In alternative, a method of feeding the components of the catalyst and the monomer to the polymerization field in an arbitrary sequence may also be employed, instead of the preparation of the catalyst by mixing the components of the catalyst in advance.

A preferred embodiment is a method, in which the components other than the compound (B) or the compound (b1) and the compound (b2), i.e., the component (A), the component (C), the component (D), and the component (E) are mixed in advance, and separately, the monomer is mixed with the compound (B) component, or the monomer is mixed with the compound (b1) and the compound (b2), and then both of them are mixed immediately before the polymerization, so as to perform the polymerization.

In the present invention, it is more preferred that the polymerization of the styrene monomer is performed in the presence of the catalyst by using a powder bed continuous polymerization apparatus. Herein, hydrogen may be added to the polymerization field for the enhancement of the catalyst activity. Hydrogen may be added to the reaction system in an amount of 0 to 20-fold, preferably 0 to 15-fold, more preferably 0 to 10-fold, and further preferably 0.1 to 10-fold, in terms of molar ratio, based on the center metal of the half metallocene transition metal compound (A). Hydrogen fed to the reaction system in the polymerization can enhance the activity of the polymerization catalyst and can suppress the amount thereof used, and thereby the residual metal amount in the styrene resin produced, for example, the residual aluminum content and the residual titanium content therein, can be lowered.

However, the amount of hydrogen added that exceeds 20-fold based on the center metal of the half metallocene transition metal compound (A) is not preferred since the proportion of the low melting point component described above is increased to deteriorate the reflow heat resistance.

In the method for producing the styrene resin of the present invention, the residual metal content in the resulting styrene resin is low due to the high catalyst activity achieved by the combination of the catalysts and/or the addition of hydrogen. Accordingly, it is not necessary to perform a decalcification treatment separately, which is advantageous in energy and is suitable for mass production.

In the case where a solvent is used in the polymerization, examples of the solvent include hydrocarbon compounds and halogenated hydrocarbon compounds, such as benzene, toluene, ethylbenzene, n-hexane, n-heptane, cyclohexane, methylene chloride, chloroform, 1,2-dichloroethane, and chlorobenzene. These compounds may be used alone or as a combination of two or more kinds thereof. While depending on the kind thereof, the monomer itself may be used as the polymerization solvent.

The amount of the catalyst used in the polymerization reaction may be generally selected in a range of 0.1 to 500 micromol, and preferably 0.5 to 100 micromol, in terms of the half metallocene transition metal compound (A), per 1 mol of the monomer, which is advantageous from the standpoint of the polymerization activity and the reactor efficiency.

The pressure in the polymerization may be generally selected in a range of ordinary pressure to 196 MPa in terms of gauge pressure. The reaction temperature is generally in a range of −50 to 150° C.

Examples of the method of controlling the molecular weight of the polymer include the selection of the kinds and the amounts of the catalyst components, and the polymerization temperature, and the introduction of hydrogen.

<Styrene Resin Composition>

According to the third embodiment of the present invention, there is provided a styrene resin composition containing 50 to 95% by mass of a thermoplastic resin composition and 5 to 50% by mass of a glass filler, the thermoplastic resin composition containing 100 parts by mass of a thermoplastic resin ($SC^A$) containing 80 to 100% by mass of a styrene resin having a syndiotactic structure and 0 to 20% by mass of a rubbery elastic material, 0.2 to 2.0 parts by mass of at least one kind of an antioxidant ($SC^B$) selected from the group consisting of a phenol-based antioxidant and a sulfur antioxidant, 1.5 to 5.0 parts by mass of at least one kind of a compound ($SC^C$) selected from the group consisting of a polyphenylene ether and a modified polyphenylene ether, and at least one kind selected from the group consisting of a nucleating agent and a release agent.

[Thermoplastic Resin ($SC^A$)]

The styrene resin contained in the thermoplastic resin ($SC^A$) in the present embodiment is not particularly limited, as far as the styrene resin is a styrene resin having a syndiotactic structure, and specifically, the styrene resin of the first embodiment and the styrene resin obtained by the second embodiment are preferably used. The other components are described in detail below.

Various materials may be used as the rubbery elastic material. Examples thereof include natural rubber, polybutadiene, polyisoprene, polyisobutylene, neoprene, polysulfide rubber, Thiokol rubber, acrylic rubber, urethane rubber, silicone rubber, epichlorohydrin rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), core-shell type particulate elastic materials, such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), siloxane-containing core-shell rubbers, e.g., methyl methacrylate-butyl acrylate-siloxane, and rubber obtained by modifying these materials.

Among these, SBR, SBS, SEB, SEBS, SIR, SEP, SIS, SEPS, core-shell rubber, rubber obtained by modifying these materials, and the like are preferably used.

Examples of the modified rubbery elastic material include materials obtained by modifying, for example, styrene-butyl acrylate copolymer rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), and the like, with a modifier having a polar group.

Among these, rubber obtained by modifying SEB, SEBS, SEP, SEPS, EPR, or EPDM is preferably used. Specific examples thereof include maleic anhydride-modified SEBS, maleic anhydride-modified SEPS, maleic anhydride-modified EPR, maleic anhydride-modified EPDM, epoxy-modified SEBS, and epoxy-modified SEPS. The rubbery elastic materials may be used alone or as a combination of two or more kinds thereof.

The thermoplastic resin ($SC^A$) in the thermoplastic resin composition contains 80 to 100% by mass of the styrene resin and 0 to 20% by mass of the rubbery elastic material, with the total being 100% by mass. The amount of the styrene resin (SPS) that is less than 80% by mass in the thermoplastic resin ($SC^A$) is not preferred since the resulting molded article has a lowered mechanical strength. The amount of the styrene resin in the thermoplastic resin ($SC^A$) is preferably 85% by mass or more, more preferably 90% by mass or more, further preferably 95% by mass or more, and particularly preferably 100% by mass. The compound exemplified as the compound ($SC^C$) described later is not included in the rubbery elastic material.

[Antioxidant ($SC^B$)]

The antioxidant ($SC^B$) is at least one kind of an antioxidant selected from the group consisting of a phenol-based antioxidant and a sulfur antioxidant. The styrene resin composition of the present embodiment does not contain a phosphorus antioxidant. A phosphorus antioxidant existing in the composition may form an acid under a high humidity condition and a water immersion condition. The phosphorus antioxidant is not preferred since the acid thus formed may deteriorate the compatibility between the thermoplastic resin ($SC^A$) and the glass filler described later, which may lower the mechanical strength of the resulting molded article.

The known materials may be used as the phenol-based antioxidant, and specific examples thereof include 2,6-di-tert-butyl-4-methylphenol; 2,6-diphenyl-4-methoxyphenol; 2,2'-methylenebis(6-tert-butyl-4-methylphenol); 2,2'-methylenebis(6-tert-butyl-4-methylphenol); 2,2'-methylenebis[4-methyl-6-(α-methylcyclohexyl)phenol]; 1,1-bis(5-tert-butyl-4-hydroxy-2-methylphenyl)butane; 2,2'-methylenebis(4-methyl-6-cyclohexylphenol); 2,2'-methylenebis(4-methyl-6-nonylphenol); 1,1,3-tris(5-tert-butyl-4-hydroxy-2-methylphenyl)butane; 2,2-bis(5-tert-butyl-4-hydroxy-2-methylphenyl)-4-n-dodecylmercaptobutane; ethylene glycol bis[3,3-bis(3-tert-butyl-4-hydroxyphenyl) butyrate]; 1,1-bis(3,5-dimethyl-2-hydroxyphenyl)-3-(n-dodecylthio)butane; 4,4'-thiobis(6-tert-butyl-3-methylphenol); 1,3,5-tris(3,5-di-tert-butyl-4-hydroxybenzyl)-2,4,6-trimethylbenzene; dioctadecyl 2,2-bis(3,5-di-tert-butyl-4-hydroxybenzyl)malonate ester; n-octadecyl-3-(4-hydroxy-3,5-di-tert-butylphenyl) propionate; tetrakis[methylene (3,5-di-tert-butyl-4-hydroxyhydrocinnamate)]methane; and pentaerythritol tetrakis(3-(3,5-di-tert-butyl-4-hydroxyphenyl)propionate.

Various materials may be used as the sulfur antioxidant. Specific examples thereof include dilauryl 3,3'-thiodipropionate, ditridecyl 3,3'-thiodipropionate, dimyristyl 3,3'-thiodipropionate, distearyl 3,3'-thiodipropionate, bis(2-methyl-4-(3-n-alkyl($C_{12}$ or $C_{14}$)thiopropionyloxy)-5-t-butylphenyl) sulfide, pentaerythrityl tetrakis(3-laurylthiopropionate), 2,2-thiodiethylenebis[3-(3,5-di-tert-butyl-4-hydroxyphenyl) propionate], 4,4'-thiobis(3-methyl-6-tert-butylphenol), 2-mercaptobenzimidazole, 2-mercaptomethylbenzimidazole, and 2,2-bis[[3-(dodecylthio)-1-oxopropyloxy]methyl]-1,3-propandiyl bis[3-(dodecylthio)propionate].

The at least one kind of the antioxidant selected from the group consisting of a phenol-based antioxidant and a sulfur antioxidant may be used alone or as a mixture of two or more kinds thereof. The sulfur antioxidant is excellent in long-term heat resistance but has problems in odor and the like, and therefore a phenol-based antioxidant is more preferably used as the antioxidant ($SC^B$). The thermoplastic resin composition contains 0.2 to 2.0 parts by mass of the antioxidant ($SC^B$) per 100 parts by mass of the thermoplastic resin ($SC^A$). The amount of the antioxidant that is less than 0.2 part by mass is not preferred since the effect of preventing decomposition and the like of the resin may be weak. In the case where the amount of the antioxidant exceeds 2.0 parts by mass, gas may be formed in molding, which results in an appearance failure, such as gas burning, of the molded article. In the case where the composition contains plural kinds of the antioxidants as the antioxidant ($SC^B$), the total amount thereof is preferably controlled to the aforementioned range. The amount of the antioxidant ($SC^B$) blended is preferably 0.3 part by mass or more, and more preferably 0.5 part by mass or more, and is preferably 1.5 parts by mass or less, more preferably 1.0 part by mass or less, and further preferably 0.8 part by mass or less, per 100 parts by mass of the thermoplastic resin ($SC^A$).

[Polyphenylene Ether and Modified Polyphenylene Ether ($SC^C$)]

The thermoplastic resin composition contains at least one kind of a compound ($SC^C$) selected from the group consisting of a polyphenylene ether and a modified polyphenylene ether. The compound ($SC^C$) has a function of a compatibilizing agent between the resin component and the glass filler described later.

Examples of the compound ($SC^C$) include a maleic anhydride-modified SEBS, a maleic anhydride-modified SEPS, a maleic anhydride-modified SEB, a maleic anhydride-modified SEP, a maleic anhydride-modified EPR, a styrene-maleic anhydride copolymer (SMA), a styrene-glycidyl methacrylate copolymer, a terminal carboxylic acid-modified polystyrene, a terminal epoxy-modified polystyrene, a terminal oxazoline-modified polystyrene, a terminal amine-modified polystyrene, a sulfonated polystyrene, a styrene ionomer, a styrene-methyl methacrylate graft polymer, a (styrene-glycidyl methacrylate)-methyl methacrylate graft polymer, an acid-modified acrylic-styrene graft polymer, a (styrene-glycidyl methacrylate)-styrene graft polymer, a polybutylene terephthalate-polystyrene graft polymer, modified styrene polymers, such as a maleic anhydride-modified syndiotactic polystyrene, a fumaric acid-modified syndiotactic polystyrene, a glycidyl methacrylate-modified syndiotactic polystyrene, and an amine-modified syndiotactic polystyrene, and modified polyphenylene ether polymers, such as a (styrene-maleic anhydride)-polyphenylene ether graft polymer, a maleic anhydride-modified polyphenylene ether (PPE), a fumaric acid-modified polyphenylene ether, a glycidyl methacrylate-modified polyphenylene ether, and an amine-modified polyphenylene ether. Among these, a maleic anhydride-modified polyphenylene ether (PPE) and a fumaric acid-modified polyphenylene ether are particularly preferred.

The thermoplastic resin composition contains 1.5 to 5.0 parts by mass of at least one kind of the compound ($SC^C$) selected from the group consisting of a polyphenylene ether and a modified polyphenylene ether per 100 parts by mass of the thermoplastic resin ($SC^A$). The amount of the compound ($SC^C$) that is less than 1.5 parts by mass is not preferred since the compatibility between the thermoplastic resin ($SC^A$) and the glass filler described later is deteriorated to lower the mechanical strength of the resulting molded article. The amount of the compound ($SC^C$) that exceeds 5.0 parts by mass is not preferred since the crystallinity of the composition is decreased to cause such problems as the decrease of the heat resistance and the releasability in molding. In the case where the composition contains plural kinds of the compounds ($SC^C$), the total amount thereof is preferably controlled to the aforementioned range. The amount of the compound ($SC^C$) blended is preferably 1.5 to 4.5 parts by mass, more preferably 1.8 to 4.0 parts by mass, and further preferably 2.0 to 4.0 parts by mass, per 100 parts by mass of the thermoplastic resin ($SC^A$).

The thermoplastic resin composition contains at least one kind selected from a nucleating agent and a release agent, and preferably contains both a nucleating agent and a release agent.

As the nucleating agent, known ones may be arbitrarily selected and used, for example, metal salts of carboxylic acid, such as aluminum di(p-tert-butylbenzoate), metal salts of phosphoric acid, such as sodium methylenebis(2,4-di-tert-butylphenol)acid phosphate, talc, and a phthalocyanine derivative. Specific examples of the trade names thereof include Adeka Stab NA-10, Adeka Stab NA-11, Adeka Stab NA-21, Adeka Stab NA-30, Adeka Stab NA-35, and Adeka Stab NA-70, produced by Adeka Corporation, and PTBBA-AL, produced by Dainippon Ink And Chemicals, Inc. The nucleating agent may be used alone or as a combination of two or more kinds thereof. The blending amount of the nucleating agent is not particularly limited, and is preferably 0.1 to 3.0 parts by mass, more preferably 0.2 to 2.0 parts by mass, further preferably 0.3 to 2.0 parts by mass, and still further preferably 0.3 to 1.5 parts by mass, per 100 parts by mass of the thermoplastic resin ($SC^A$). The nucleating agent contained enhances the crystallization speed, and thus can enhance the relative crystallinity of a molded article, such as a connector, using the styrene resin composition. Further, excellent reflow heat resistance can be obtained.

As the release agent, known ones may be arbitrarily selected and used, for example, polyethylene wax, a silicone oil, a long-chain carboxylic acid, a long-chain carboxylic acid metal salt, and the like. These release agents may be used alone or as a combination of two or more kinds thereof. The blending amount of the release agent is not particularly limited, and is preferably 0.1 to 3 parts by mass, and more preferably 0.2 to 1 part by mass, per 100 parts by mass of the thermoplastic resin ($SC^A$). The release agent contained can enhance the releasability in the production of a molded article, such as a connector, using the styrene resin composition.

[Glass Filler]

The styrene resin composition of the present embodiment contains a glass filler.

The glass filler used may be commercially available chopped strands and roving. The fiber diameter thereof is preferably 1 to 30 μm, and more preferably 3 to 20 μm. The glass filler having a fiber diameter within the range may not adversely affect the moldability and the appearance of the product. In the case where chopped strands are used, the fiber length thereof is not particularly limited, and is preferably 1 to 10 mm from the standpoint of the handleability.

The glass filler preferably has a surface that is treated with an aminosilane. Examples of the aminosilane used for the treatment include a monoaminosilane, a diaminosilane, and a triaminosilane.

Specific examples of the aminosilane include N-ß-(aminoethyl)-γ-aminopropyltrimethoxysilane, N-ß-(aminoethyl)-γ-aminopropyltriethoxysilane, N-ß-(aminoethyl)-γ-aminopropylmethyldimethoxysilane, γ-aminopropyltriethoxysilane, N-phenyl-γ-aminopropyltrimethoxysilane, γ-aminopropyltrimethoxysilane, γ-aminopropyl-tris(2-methoxy-ethoxy)silane, N-methyl-γ-aminopropyltrimethoxysilane, N-vinylbenzyl-γ-aminopropyltriethoxysilane, 3-ureidopropyltrimethoxysilane, hexamethyldisilazane, N,N-bis(trimethylsilyl)urea, and 3-triethoxysilyl-N-(1,3-dimethylbutylidene)propylamine.

A monoaminosilane and a diaminosilane are preferred, and it is more preferred that the glass filler is treated with a diaminosilane. In the case where the surface of glass is treated with a diaminosilane, an excellent sustaining effect of the hydrothermal resistance of the resin composition may be obtained.

The styrene resin composition of the present embodiment contains the thermoplastic resin composition and the glass filler, and the styrene resin composition contains the glass filler in an amount of 5 to 50% by mass. The amount of the glass filler that is less than 5% by mass is not preferred since the resulting molded article is inferior in mechanical strength, and the amount thereof that exceeds 50% by mass is not preferred since the dispersibility of the glass filler in the composition is deteriorated to make the moldability deteriorated.

The amount of the glass filler blended is preferably 8 to 45% by mass, more preferably 10 to 40% by mass, and further preferably 15 to 35% by mass.

The styrene resin composition of the present embodiment may further contain, in addition to the aforementioned components, a crosslinking agent, a crosslinking assistant, a flame retardant, an inorganic filler other than the glass filler, an organic filler, a plasticizer, a colorant, an antistatic agent, and/or the like, which are ordinarily used, in such a range that does not impair the object of the present invention. However, a polyamide synthetic resin, such as nylon, may deteriorate the hydrothermal resistance of the composition, and thus may not contained in the styrene resin composition of the present embodiment.

As the inorganic filler other than the glass filler, fillers having various shapes, such as a fibrous form, a granular form, and a powder form, may be used. Examples of the fibrous filler include carbon fibers, whiskers, ceramic fibers, and metal fibers. Specific examples of the whiskers include boron, alumina, silica, and silicon carbide, specific examples of the ceramic fibers include gypsum, potassium titanate, magnesium sulfate, and magnesium oxide, and examples of the metal fibers include copper, aluminum, and steel. Examples of the shape of the fibrous filler include a cloth form, a mat form, a fragment cluster form, short fibers, a filament form, and whiskers. The fragment cluster form preferably has a length of 0.05 to 50 mm and a fiber diameter of 5 to 20 μm. The cloth form and the mat form preferably have a length of 1 mm or more, and preferably 5 mm or more. Examples of the granular or powder filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

The inorganic filler may be subjected to a surface treatment, and the surface treatment may be performed with a coupling agent that is ordinarily used for the surface treatment, such as a silane coupling agent and titanium coupling agent.

Examples of the organic filler include organic synthetic fibers and natural vegetable fibers. Specific examples of the organic synthetic fibers include wholly aromatic polyamide fibers and polyimide fibers.

As the production method of the styrene resin molded article of the present invention, an arbitrary one may be applied.

For example, the composition having the aforementioned components added thereto is molded to form a molded article for evaluating the hydrothermal treatment. In injection molding, the composition may be molded with a mold having a prescribed shape, and in extrusion molding, the composition is subjected to T-die molding into a film and a sheet, and the resulting film and sheet are melted under heating and extruded into a prescribed shape.

<Molded Article>

In the present invention, a molded article can be obtained by molding the styrene resin according to the first embodiment, the styrene resin obtained by the production method according to the second embodiment, or the styrene resin composition according to the third embodiment. The shape of the molded article is not particularly limited, and examples thereof include a sheet, a film, fibers, a nonwoven fabric, a container, an injection molded article, and a blow molded article. The molded article can be used particularly preferably as a molded article for reflow soldering, such as a connector material for reflow soldering, taking advantage of the heat resistance and the hydrothermal resistance of the styrene resin and the styrene resin composition of the present invention.

EXAMPLES

The present invention will be described in more detail with reference to examples below, but the present invention is not limited thereto.

(1) Measurement Method of Low Melting Point Component Amount 10 mg of the polymer obtained in each of Examples and Comparative Examples described later was held at 300° C. for 5 minutes with a differential scanning calorimeter (DSC 8500, produced by Perkin Elmer, Inc.). Thereafter, the temperature was decreased from 300° C. to 50° C. at 20° C./min, and then held at 50° C. for 5 minutes. Subsequently, the temperature was raised from 50° C. to 300° C. at 20° C./min.

A base line was drawn from 175° C. to 285° C. in the melting point peak obtained in the temperature rise process, and the area proportion A % of the range of 175 to 260° C. was designated as the amount of the low melting point component with respect to the area (100%) of the portion surrounded by the DSC curve and the base line. The measurement results are shown in Tables 1 and 2 below.

(2) Measurement Method of Triphenylmethane Amount 2 g of the polymer obtained in each of Examples and Comparative Examples described later was extracted with 100 mL of chloroform under refluxing, and reprecipitated by adding 200 mL of methanol thereto. The solution was filtered, and the filtrate was evaporated to dryness, to which chloroform was added to make 5 mL of a solution. The specimen was measured by gas chromatography (Agilent 6850, produced by Agilent Technologies, Inc.) with a column BPX-5 (15 m×0.25 mm, membrane thickness: 0.25 μm) at an oven temperature raised from 100° C. (0 min) to 350° C. (10 min) at a rate of 10° C./min, with an injection temperature of 350° C., a detection temperature of 350° C., FID as a detector, He as a carrier gas, a linear velocity of 40 cm/sec, an injection amount of 1.0 μL, and a split of 1/10, and the triphenylmethane amount was quantitatively determined. The measurement results are shown in Tables 1 and 2 below.

(3) Measurement Method of Residual Aluminum Content and Residual Titanium Content The residual aluminum content and the residual titanium content of the polymer obtained in each of Examples and Comparative Examples described later were quantitatively determined by the fluorescent X-ray spectroscopy.

1. Apparatus

Magi X-PW2403, produced by Malvern Panalytical, Ltd., was used as a fluorescent X-ray apparatus, and PR gas (Ar/CH$_4$: 90/10) was used in measurement.

2. Method

A compressed plate having a diameter of approximately 45 mm and a thickness of 2 mm was produced from the specimen with a hot press molding machine (AJHC-37, produced by Oji Machine Co., Ltd.), and measured, using the fluorescent X-ray apparatus, for the fluorescent X-ray intensity of the target element (i.e., residual aluminum or residual titanium) under the conditions shown in Table A below, and the element concentration was obtained based on the calibration curve produced and registered in advance (the calibration curve herein was a calibration curve of the concentration of the standard specimen and the X-ray intensity). The measurement results are shown in Tables 1 and 2 below.

TABLE A

| Measurement condition | | Residual aluminum | Residual titanium |
|---|---|---|---|
| X-ray tube | | SST-mAX | SST-mAX |
| Voltage | kV | 40 | 24 |
| Current | mA | 75 | 125 |
| Dispersive crystal | | LiF (200) | PE (002) |
| Detection mode | | Flow | Flow |
| 2θ | deg | 86.154 | 145.05 |

(4) Measurement Method of Surface Roughness

1. Production Method of Resin Composition for Molded Article Used for Reflow Heat Resistance Test To 100 parts by mass of a composition containing 90% by mass of the syndiotactic polystyrene produced in each of Examples and Comparative Examples described later and 10% by mass of a hydrogenated styrene thermoplastic elastomer SEBS (Septon 8006, produced by Kuraray Co., Ltd.), 3 parts by mass of maleic anhydride-modified polyphenylene ether (PPE), 0.3 part by mass of Irganox 1010 (produced by BASF SE) as an antioxidant, 0.3 part by mass of Adeka Stab NA-11 (produced by Adeka Corporation) as a nucleating agent, and 0.3 part by mass of SH 200CV-13,000CS (produced by Dow Corning Toray Co., Ltd.) as a release agent were mixed and dry-blended with a Henschel mixer. Subsequently, the resin composition was kneaded with a twin screw extruder while side-feeding 30% by mass of glass fibers 03JA-FT164G (produced by Owens Corning Japan LLC), so as to produce pellets. The PPE used was produced by the method described in Example 2 (1) of WO 96/16997.

2. Production of Molded Article Used for Reflow Heat Resistance Test

By using the pellets obtained in the item 1 above, a molded article having a box shape (20 mm in length×10 mm in width×10 mm in height, thickness: 0.5 mm) was produced with an injection molding machine ES1000, produced by Nissei Plastic Industrial Co., Ltd. (resin temperature: 300° C., mold surface temperature: 150° C.).

3. Reflow Heat Resistance Test

The molded article was subjected to a reflow furnace heat resistance test by passing through a reflow furnace (UNI-5016F, produced by Antom Co., Ltd.).

The conveying speed of the reflow furnace was 0.2 m/min, and the heat resistance of the molded article was evaluated by using the following temperature profile. Specifically, preheating was performed in such a manner that the molded article was heated to raise the surface temperature thereof to 170° C., and then retained at that temperature (170° C.) for 130 seconds. Thereafter, the temperature of the reflow furnace was set in such a manner that the molded article was further heated to raise the peak temperature of the surface of the molded article to 260° C.

4. Measurement of Surface Roughness Before and After Reflow Heat Resistance Test The top surface of the molded article was measured for the surface roughness (Ra: arithmetic average roughness) before and after the reflow heat resistance test with a scanning confocal microscope (Optelics H1200, produced by Lasertec Corporation). The measurement results are shown in Tables 1 and 2 below.

Examples 1 to 5 and Comparative Examples 1 to 4

<Styrene Resin and Production Method Thereof>

The styrene resin and the production method thereof of the present invention are specifically described.

A complete mixing tank reactor (inner diameter: 550 mm, height: 1,155 mm, inner capacity: 254 L) having a double helical blade having been cleaned was heated to 90° C. and dried in vacuum for 3 hours. Subsequently, after recovering the pressure of the reactor with nitrogen gas, the temperature thereof was decreased to 80° C. 60 kg of the SPS powder having been sufficiently dried by passing dried nitrogen gas therethrough was fed to the reactor, and further dried under a nitrogen stream for 2 hours. Subsequently, agitation was started, and the temperature inside the reactor was controlled to 70° C. Thereafter, the feed of the styrene monomer and the catalyst was started. The kinds and the proportions of the catalysts, and the amount of hydrogen added are shown in Tables 1 and 2 below. In the tables, "SM" shows the styrene monomer.

Simultaneous with the feed of the styrene monomer and the catalyst, the feed of n-pentane as an inert solvent to the reactor was started. n-Pentane was immediately evaporated to create a good fluidized state of the contents, together with the agitation with the double helical blade. The produced powder was discharged intermittently from the bottom of the tank.

TABLE 1

| | | Example | | | | |
|---|---|---|---|---|---|---|
| | | 1 | 2 | 3 | 4 | 5 |
| Titanium species | | Aa | Aa | Aa | Aa | Aa |
| (b1)/(b2) ratio | | 1/1.2 | 1/1.2 | 1/1.2 | 1/1.2 | 1/1.2 |

TABLE 1-continued

| | | Example | | | | |
|---|---|---|---|---|---|---|
| | | 1 | 2 | 3 | 4 | 5 |
| Catalyst ratio (A)/(C)/(E)/(D) | | 1/50/25/0 | 1/50/23/2 | 1/50/23/2 | 1/50/23/2 | 1/50/25/0 |
| (b1)/Ti ratio | | 4.80 | 4.00 | 3.80 | 3.80 | 4.40 |
| SM/Ti ratio | | 83300 | 70000 | 67300 | 67300 | 77800 |
| Hydrogen/Ti ratio | | 0.0 | 0.0 | 3.7 | 3.7 | 4.4 |
| Low melting point component amount | % | 20 | 23 | 24 | 26 | 28 |
| Triphenylmethane amount | ppm by mass | 50 | 50 | 50 | 40 | 30 |
| Residual aluminum content | ppm by mass | 280 | 340 | 450 | 470 | 490 |
| Residual titanium content | ppm by mass | 6 | 8 | 10 | 10 | 9 |
| Difference in surface roughness | μm | 1.1 | 1.2 | 1.2 | 1.4 | 1.5 |
| Evaluation of surface roughness | | A | A | A | A | A |

TABLE 2

| | | Comparative Example | | | |
|---|---|---|---|---|---|
| | | 1 | 2 | 3 | 4 |
| Titanium species | | Aa | Ab | Ab | Ab |
| (b1)/(b2) ratio | | — | — | — | — |
| Catalyst ratio (A)/(C)/(E)/(D) | | 1/110/25/0 | 1/75/25/0 | 1/75/25/0 | 1/75/25/0 |
| (b1)/Ti ratio | | — | — | — | — |
| SM/Ti ratio | | 70000 | 58300 | 67300 | 79500 |
| Hydrogen/Ti ratio | | 100 | 100 | 100 | 91 |
| Low melting point component amount | % | 30 | 35 | 36 | 41 |
| Triphenylmethane amount | ppm by mass | 0 | 0 | 0 | 0 |
| Residual aluminum content | ppm by mass | 600 | 540 | 450 | 400 |
| Residual titanium content | ppm by mass | 8 | 9 | 8 | 7 |
| Difference in surface roughness | μm | 1.7 | 2.5 | 2.8 | 3.8 |
| Evaluation of surface roughness | | B | C | C | C |

In the tables, the difference in surface roughness means (surface roughness after reflow heat resistance test)–(initial surface roughness at room temperature) and shown by ΔRa. The standard of the evaluation result was as follows.

A: ΔRa≤1.5 μm
B: 1.51 μm<ΔRa≤2.0 μm
C: 2.0 μm<ΔRa

The catalysts used were as follows.
Half metallocene transition metal compound (A)
Aa: octahydrofluorenyl titanium trimethoxide
Ab: pentamethylcyclopentadienyl titanium trimethoxide
Compound (b1): triphenylmethanol
Compound (b2): triisobutylaluminum
Compound (C): methylaluminoxane
Compound (E): triisobutylaluminum
Compound (D): diisobutylaluminum hydride Examples 6 to 13 and Comparative Examples 5 to 11

The components except for the glass filler were mixed at the ratios shown in Table 3 and dry-blended with a Henschel mixer. Subsequently, the resin composition was kneaded with a twin screw extruder while side-feeding 30% by mass of glass filler shown in Table 3 with respect to 70% by mass of the dry-blended thermoplastic resin composition, so as to produce pellets. By using the pellets obtained, test pieces used for the following tests were molded with an injection molding machine SH100A, produced by Sumitomo Heavy Industries, Ltd. (resin temperature: 300° C., mold surface temperature: 150° C.).

5. Hydrothermal Resistance Test (Pressure Cooker Test)

Molded articles for tensile test pieces of ASTM D638 Type I was obtained under the aforementioned molding condition. The test pieces were placed in a stainless steel mesh basket with a stainless steel wire preventing the test pieces from being in contact with each other. The basket was placed in a pressure cooker test machine (PC305 III, produced by Hirayama Manufacturing Corporation), and pure water was poured into the pressure cooker test machine to immerse the test pieces therein, followed by closing the lid to block the external air. Subsequently, the interior of the test machine was heated to 120° C. and retained for 500 hours.

For the hydrothermal resistance, the tensile strength of the test piece was measured before and after the hydrothermal treatment. The tensile strength was measured according to ASTM D638, and the retention rate of tensile strength was obtained according to the following expression.

retention rate of tensile strength (%) (tensile strength after hydrothermal treatment)/(tensile strength before hydrothermal treatment)×100

6. Outgas Amount 10 mg of the pellets obtained in each of Examples and Comparative Examples were precisely weighed and placed in a measurement container. The measurement container was mounted on a thermal desorption unit (TDU, produced by Gerstel, Inc.), and the outgas formed under heating to 310° C. for 10 minutes was measured by gas chromatography (Agilent 7890B, produced by Agilent Technologies, Inc.). The outgas amount was calculated based on the calibration curve using triphenylmethane as the standard substance.

<Thermal Desorption Condition>
Thermal desorption condition: temperature rise from 50° C. to 310° C. (temperature rise rate: 720° C./min)
<CIS Condition>
Temperature rise from −50° C. to 350° C. (temperature rise rate: 12° C./sec, split ratio: 30/1)

<GC Condition>

Column: DB-5MS (produced by Agilent Technologies, Inc., length: 30 m, inner diameter: 0.25 mm, membrane thickness: 0.25 μm)

Carrier gas: helium

Oven: temperature rise from 50° C. to 330° C. (temperature rise rate: 10° C./min)

Detector (FID) temperature: 330° C.

7. Gas Burning 2,000 shots of strip test pieces of 220 mm in length×25 mm in width×2 mm in thickness were molded under the aforementioned molding condition. The state of gas burning at the end portion of the molded article was visually observed.

A: no gas burning observed

C: discoloration due to gas burning observed

8. Releasability of Connector and Relative Crystallinity of Connector

<Releasability>

120-pin PCI connectors was molded (four-cavity mold) under the aforementioned molding condition and also under conditions of a resin filling time of 0.7 second, a kept pressure of 1,582 kgf/cm², a kept pressure time of 4.0 seconds, and a cooling time of 20.0 seconds. The deformation of the PCI connectors in releasing was observed.

A: no deformation observed

C: protruded pin mark and deformation of side wall observed

<Relative Crystallinity>

The side wall surface of the PCI connector obtained above was cut to provide 10 mg of a test piece. The test piece was held at 50° C. for 5 minutes and then heated from 50° C. to 300° C. under condition of 20° C./min, with a differential scanning calorimeter (DSC 8500, produced by Perkin Elmer, Inc.).

The relative crystallinity was calculated from the amount of heat of the melting point peak obtained in the temperature rise process and the amount of heat of the cold crystallization peak according to the following expression. The absolute values of the amounts of heat were used.

relative crystallinity (%) (|amount of heat of melting point peak|−amount of heat of cold crystallization peak|)/(|amount of heat of melting point peak|)×100

9. Odor

The odor around the injection molding machine in molding the test pieces was sensorily evaluated.

A: No odor observed

C: Odor observed

10. Measurement Method of Surface Roughness (1) Production of Molded Article Used for Reflow Heat Resistance Test By using the pellets obtained in each of Examples 6 to 13 and Comparative Examples 5 to 11, a molded article having a box shape (20 mm in length×10 mm in width×10 mm in height, thickness: 0.5 mm) was produced with an injection molding machine ES1000, produced by Nissei Plastic Industrial Co., Ltd. (resin temperature: 300° C., mold surface temperature: 150° C.).

(2) Reflow Heat Resistance Test

The molded article was subjected to a reflow furnace heat resistance test by passing through a reflow furnace (UNI-5016F, produced by Antom Co., Ltd.).

The conveying speed of the reflow furnace was 0.2 m/min, and the heat resistance of the molded article was evaluated by using the following temperature profile. Specifically, preheating was performed in such a manner that the molded article was heated to raise the surface temperature thereof to 170° C., and then retained at that temperature (170° C.) for 130 seconds. Thereafter, the temperature of the reflow furnace was set in such a manner that the molded article was further heated to raise the peak temperature of the surface of the molded article to 260° C.

(3) Measurement of Surface Roughness Before and After Reflow Heat Resistance Test The top surface of the molded article was measured for the surface roughness (Ra: arithmetic average roughness) before and after the reflow heat resistance test with a scanning confocal microscope (Optelics H1200, produced by Lasertec Corporation).

(4) Difference in Surface Roughness Before and After Reflow Heat Resistance Test The difference in surface roughness was calculated by (surface roughness after reflow heat resistance test)−(initial surface roughness at room temperature) and shown by ΔRa. The standard of the evaluation result was as follows.

A: ΔRa≤1.5 μm

B: 1.5 μm<ΔRa≤2.0 μm

C: 2.0 μm<ΔRa

TABLE 3

|  |  |  | Example | | | | | | | |
| --- | --- | --- | --- | --- | --- | --- | --- | --- | --- | --- |
|  |  |  | 6 | 7 | 8 | 9 | 10 | 11 | 12 | 13 |
| Thermoplastic resin composition |  | % by | 70 | 70 | 70 | 70 | 70 | 70 | 70 | 70 |
| GF | T-330H | mass | 30 | 30 | 30 | 30 | 30 |  | 30 | 30 |
|  | 03 JAFT 164G |  |  |  |  |  |  | 30 |  |  |
|  |  | Thermoplastic resin composition (composition) | | | | | | | | |
| Thermoplastic resin (SC$^A$) | SPS (Example 1) | % by |  |  |  |  | 90 |  |  |  |
|  | SPS (Example 3) | mass | 100 | 90 | 90 | 90 |  | 90 | 90 |  |
|  | SPS (Comparative Example 2) |  |  |  |  |  |  |  |  | 90 |
|  | Rubbery elastic material |  | 0 | 10 | 10 | 10 | 10 | 10 | 10 | 10 |
| Antioxidant (SC$^B$) | Irganox 1010 | % by | 0.6 | 0.6 | 0.6 | 0.3 | 0.3 | 0.6 |  | 0.3 |
|  | SUMI. TP-D | mass |  |  |  |  |  |  | 0.6 |  |
|  | PEP 36 |  |  |  |  |  |  |  |  |  |
| PPE (SC$^C$) | CX-1 |  | 2 | 2 | 4 | 3 | 3 | 2 | 2 | 3 |
| Nucleating agent | NA-11 |  | 1 | 1 | 1 | 0.3 | 0.3 | 1 | 1 | 0.3 |
| Silicone oil | KF53 |  | 0.3 | 0.3 | 0.3 | 0.3 | 0.3 | 0.3 | 0.3 | 0.3 |
| Tensile strength |  | MPa | 125 | 121 | 123 | 120 | 120 | 122 | 121 | 120 |
| Tensile strength after | 500 hrs | MPa | 85 | 79 | 82 | 79 | 79 | 96 | 78 | 79 |

TABLE 3-continued

|  |  |  | Example | | | | | | | |
|---|---|---|---|---|---|---|---|---|---|---|
|  |  |  | 6 | 7 | 8 | 9 | 10 | 11 | 12 | 13 |
| hydrothermal treatment |  |  |  |  |  |  |  |  |  |  |
| Tensile strength retention rate 500 hrs | | % | 68 | 65 | 67 | 66 | 66 | 79 | 64 | 66 |
| Odor |  | — | A | A | A | A | A | A | C | A |
| Relative crystallinity of connector |  | % | 100 | 100 | 100 | 100 | 100 | 100 | 100 | 100 |
| Releasability in molding connector |  | — | A | A | A | A | A | A | A | A |
| Outgas amount |  | ppm | 1336 | 1343 | 1341 | 1310 | 1310 | 1344 | 1300 | 1310 |
| Gas burning (visual) |  | — | A | A | A | A | A | A | A | A |
| Difference in surface roughness before and after reflow heat resistance test ΔRa | | μm | 1.2 | 1.2 | 1.2 | 1.2 | 1.1 | 1.2 | 1.2 | 2.5 |
| Evaluation of surface roughness |  | — | A | A | A | A | A | A | A | C |

TABLE 4

|  |  |  | Comparative Example | | | | | | |
|---|---|---|---|---|---|---|---|---|---|
|  |  |  | 5 | 6 | 7 | 8 | 9 | 10 | 11 |
| Thermoplastic resin composition |  | % by | 70 | 70 | 70 | 70 | 70 | 70 | 70 |
| GF | T-330H<br>03 JAFT 164G | mass | 30 | 30 | 30 | 30 | 30 | 30 | 30 |
| Thermoplastic resin composition (composition) | | | | | | | | | |
| Thermoplastic resin (SC$^A$) | SPS (Example 3) | % by | 90 |  | 90 | 90 | 90 | 90 | 90 |
|  | SPS (Comparative Example 2) | mass |  | 90 |  |  |  |  |  |
|  | Rubbery elastic material |  | 10 | 10 | 10 | 10 | 10 | 10 | 10 |
| Antioxidant (SC$^B$) | Irganox 1010 | % by |  | 0.6 | 0.6 | 0.6 | 3 | 5 | 0.6 |
|  | SUMI. TP-D | mass |  |  |  |  |  |  |  |
|  | PEP 36 |  | 0.6 |  |  |  |  |  |  |
| PPE (SC$^C$) | CX-1 |  | 2 | 0 | 0.5 | 10 | 2 | 2 | 2 |
| Nucleating agent | NA-11 |  | 1 | 1 | 1 | 1 | 1 | 1 | 0 |
| Silicone oil | KF53 |  | 0.3 | 0.3 | 0.3 | 0.3 | 0.3 | 0.3 | 0 |
| Tensile strength |  | MPa | 121 | 69 | 113 | 130 | 120 | 121 | 121 |
| Tensile strength after 500 hrs hydrothermal treatment | | MPa | 50 | 67 | 70 | 87 | 79 | 78 | 78 |
| Tensile strength retention rate 500 hrs | | % | 41 | 97 | 62 | 67 | 66 | 64 | 64 |
| Odor |  | — | A | A | A | A | A | A | A |
| Relative crystallinity of connector |  | % | 100 | 100 | 100 | 90 | 100 | 100 | 95 |
| Releasability in molding connector |  | — | A | A | A | C | A | A | C |
| Outgas amount |  | ppm | 2350 | 1340 | 1338 | 1330 | 1590 | 1795 | 1250 |
| Gas burning (visual) |  | — | C | A | A | A | C | C | A |
| Difference in surface roughness before and after reflow heat resistance test ΔRa | | μm | 1.2 | 1.2 | 1.2 | 4.5 | 1.2 | 1.2 | 3.5 |
| Evaluation of surface roughness |  | — | A | A | A | C | A | A | C |

The components used in Tables 3 and 4 were as follows.

<Thermoplastic Resin (SC$^A$)>
SPS (Example 1): styrene resin obtained in Example 1
SPS (Example 3): styrene resin obtained in Example 3
SPS (Comparative Example 2): styrene resin obtained in Comparative Example 2
Rubbery elastic material: hydrogenated styrene thermoplastic elastomer SEBS, Septon 8006, produced by Kuraray Co., Ltd.

<Antioxidant (SC$^B$)>
Irganox 1010:
pentaerythritol tetrakis(3-(3,5-di-tert-butyl-4-hydroxyphenyl)propionate, produced by BASF SE
SUMI. TP-D:
abbreviation of Sumilizer TP-D, produced by Sumitomo Chemical Co., Ltd., 2,2-bis[[3-(dodecylthio)-1-oxopropyloxy]methyl]-1,3-propandiyl bis[3-(dodecylthio)propionate]
PEP 36:
3,9-bis(2,6-di-tert-butyl-4-methylphenoxy)-2,4,8,10-tetraoxa-3,9-diphosph aspiro[5.5]undecane, produced by Adeka Corporation <PPE (SC$^C$)>
CX-1: fumaric acid-modified polyphenylene ether, produced by Idemitsu Kosan Co., Ltd.

<Nucleating Agent>
NA-11: Adeka Stab NA-11, produced by Adeka Corporation

<Silicone Oil>
KF53: methylphenylsilicone oil, produced by Shin-Etsu Silicone Co., Ltd.

<Glass Filler: GF>
T-330H: chopped glass strands surface-treated with monoaminosilane, ECS03T-330H, produced by Nippon Electric Glass Co., Ltd., average fiber diameter: 10.5 μm, average fiber length: 3 mm
03 JAFT 164G: chopped glass strands surface-treated with diaminosilane, produced by Owens Corning Japan LLC, average fiber diameter: 10.5 μm, average fiber length: 3 mm

The invention claimed is:
1. A styrene resin composition comprising 50 to 95% by mass of a thermoplastic resin composition and 5 to 50% by mass of a glass filler, the thermoplastic resin composition comprising
100 parts by mass of a thermoplastic resin (SC$^A$) containing 80 to 100% by mass of a styrene resin having a syndiotactic structure and 0 to 20% by mass of a rubbery elastic material,
1.5 to 5.0 parts by mass of at least one compound (SC$^C$) selected from the group consisting of a polyphenylene ether and a modified polyphenylene ether, and
at least one agent selected from the group consisting of a nucleating agent and a release agent, wherein the styrene resin having the syndiotactic structure has a proportion of an endothermic amount obtained in a range of 175 to 260° C. of 24% or less based on the total endothermic amount taken as 100%, which are measured at a temperature rise rate of 20° C./min through differential scanning calorimetry, and
wherein the styrene resin having the syndiotactic structure has a residual aluminum content of 450 ppm by mass or less.

2. The styrene resin composition according to claim 1, wherein the thermoplastic resin composition further comprises 0.2 to 2.0 parts by mass of at least one antioxidant (SC$^B$) selected from the group consisting of a phenol-based antioxidant and a sulfur antioxidant per 100 parts by mass of the thermoplastic resin (SC$^A$).

3. The styrene resin composition according to claim 2, wherein the at least one antioxidant (SC$^B$) is a phenol-based antioxidant.

4. The styrene resin composition according to claim 1, wherein the at least one agent is the nucleating agent and an amount of the nucleating agent is from 0.1 to 3.0 parts by mass per 100 parts by mass of the thermoplastic resin (SC$^A$).

5. The styrene resin composition according to claim 1, wherein the at least one agent is the release agent and an amount of the release agent is from 0.1 to 3.0 parts by mass per 100 parts by mass of the thermoplastic resin (SC$^A$).

6. The styrene resin composition according to claim 1, wherein the styrene resin having the syndiotactic structure comprises triphenylmethane.

7. The styrene resin composition according to claim 6, wherein an amount of the triphenylmethane in the styrene resin having the syndiotactic structure is 10 ppm by mass or more.

8. The styrene resin composition according to claim 7, wherein the amount of the triphenylmethane in the styrene resin having the syndiotactic structure is 10 ppm by mass or more 250 ppm by mass or less.

9. The styrene resin composition according to claim 1, wherein the styrene resin having the syndiotactic structure has a residual titanium content of 12 ppm by mass or less.

10. The styrene resin composition according to claim 9, wherein the residual aluminum content is 70 ppm by mass or more and 450 ppm by mass or less and the residual titanium content is 1.5 ppm by mass or more and 12 ppm by mass or less.

11. The styrene resin composition according to claim 1, wherein the rubbery elastic material is at least one material selected from the group consisting of a styrene-butadiene block copolymer (SBR), a styrene-butadiene-styrene block copolymer (SBS), a hydrogenated styrene-butadiene block copolymer (SEB), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a core-shell rubber, and a rubber obtained by modifying these materials.

12. The styrene resin composition according to claim 1, wherein the thermoplastic resin (SC$^A$) comprises 80 to 90% by mass of the styrene resin having the syndiotactic structure and 10 to 20% by mass of the rubbery elastic material.

13. The styrene resin composition according to claim 1, wherein the compound (SC$^C$) is at least one compound selected from the group consisting of a maleic anhydride-modified polyphenylene ether (PPE) and a fumaric acid-modified polyphenylene ether.

14. The styrene resin composition according to claim 1, wherein the at least one agent is the nucleating agent selected from the group consisting of metal salts of carboxylic acid, metal salts of phosphoric acid, talc, and a phthalocyanine derivative.

15. The styrene resin composition according to claim 1, wherein the at least one agent is the release agent selected from the group consisting of polyethylene wax, a silicone oil, a long-chain carboxylic acid, and a long-chain carboxylic acid metal salt.

16. A styrene resin molded article obtained by molding the styrene resin composition according to claim 1.

17. The styrene resin molded article according to claim 16, wherein the molded article is a connector material for reflow soldering.

18. The styrene resin molded article according to claim 16, wherein the molded article is an injection molded article.

* * * * *